US012775623B2

(12) United States Patent
Ma et al.

(10) Patent No.: US 12,775,623 B2
(45) Date of Patent: Oct. 27, 2026

(54) PROCESSING STREAMING DATA

(71) Applicant: Dolby Laboratories Licensing Corporation, San Francisco, CA (US)

(72) Inventors: Jianbo Ma, Wetherill Park (AU); Richard J. Cartwright, Killara (AU); Deepak Chandran, San Francisco, CA (US); Hadis Nosrati, Queens Park (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 19/102,952

(22) PCT Filed: Aug. 22, 2023

(86) PCT No.: PCT/US2023/072614

§ 371 (c)(1),
(2) Date: Feb. 11, 2025

(87) PCT Pub. No.: WO2024/044565

PCT Pub. Date: Feb. 29, 2024

(65) Prior Publication Data

US 2026/0023746 A1 Jan. 22, 2026

Related U.S. Application Data

(60) Provisional application No. 63/511,799, filed on Jul. 3, 2023, provisional application No. 63/416,429, filed (Continued)

(51) Int. Cl.

| | |
|---|---|
| ***G06F 16/2455*** | (2019.01) |
| ***G06F 16/2452*** | (2019.01) |
| ***G06F 16/28*** | (2019.01) |

(52) U.S. Cl.

CPC .... *G06F 16/24568* (2019.01); *G06F 16/2452* (2019.01); *G06F 16/285* (2019.01)

(58) Field of Classification Search

CPC ............. G06F 16/24568; G06F 16/285; G06F 16/2452

See application file for complete search history.

(56) References Cited

U.S. PATENT DOCUMENTS 11,646,017 B1 * 5/2023 Shi .......................... G06N 3/08 704/232
2017/0262705 A1 9/2017 Li (Continued)

FOREIGN PATENT DOCUMENTS

| | | |
|---|---|---|
| JP | H11112922 A | 4/1999 |
| WO | 2021058270 A1 | 4/2021 |
| WO | 2021157234 A1 | 8/2021 |

OTHER PUBLICATIONS

Chen, X., et al., Developing real-time streaming transformer transducer for speech recognition on large-scale dataset. 2021-2021 IEEE International Conference on Acoustics, Speech and Signal Processing (ICASSP), Feb. 28, 2021, p. 5904-5908, 5 pages.

(Continued)

*Primary Examiner* — Khanh B Pham
(74) *Attorney, Agent, or Firm* — Hao Guo

(57) ABSTRACT

Disclosed herein are techniques for processing streaming data. In some embodiments, the techniques involve obtaining input data representative of a frame of streaming data. The techniques may involve identifying a query transformation, a key transformation, and a value transformation based on the input data. The techniques may involve updating a query buffer, a key buffer, and a value buffer, such that the buffers are each configured to store parameters associated with previous frames of streaming data and the frame of streaming data. The techniques may involve retrieving (Continued)

one or more query frames from the query buffer. The techniques may involve determining a dot product of the query frames and frames in the key buffer to determine a set of weights. The techniques may involve determining a weighted sum between the set of weights and frames in the value buffer, and utilizing the weighted sum to generate a streaming attention vector.

21 Claims, 18 Drawing Sheets

Related U.S. Application Data on Oct. 14, 2022, provisional application No. 63/401,046, filed on Aug. 25, 2022.

(56) References Cited

U.S. PATENT DOCUMENTS

| | | | | |
|---|---|---|---|---|
| 2018/0047389 | A1 | 2/2018 | Song | |
| 2019/0236451 | A1 | 8/2019 | Jaitly | |
| 2020/0117906 | A1* | 4/2020 | Lee | G06V 10/764 |
| 2021/0005182 | A1* | 1/2021 | Han | G06N 3/045 |
| 2021/0233511 | A1 | 7/2021 | Li | |
| 2022/0310070 | A1* | 9/2022 | Moritz | G06N 3/0495 |
| 2024/0403722 | A1* | 12/2024 | Yu | G06N 3/063 |
| 2025/0201267 | A1* | 6/2025 | Kim | G10L 15/02 |

OTHER PUBLICATIONS

Chiu, C., et al., Monotonic chunkwise attention, ICLR 2018 Conference Paper, Feb. 23, 2018, arXiv:1712.05382, 16 pages.
Hawthorne, C., et al., General-purpose, long-context autoregressive modeling with Perceiver AR, Proceedings of the 39th International Conference on Machine Learning, arXiv: 2022.077652V2, Jun. 14, 2022, 24 pages.
Panayotov, V. et al., Librispeech: An ASR Corpus Based on Public Domain Audio Books, 2015 IEEE international conference on acoustics, speech and signal processing (ICASSP), p. 5206-5210. 5 pages.
Shi, Y., et al., Emformer: Efficient Memory Transformer Based Acoustic Model for Low Latency Streaming Speech Recognition, arXiv: 2010.107594v4, Dec. 30, 2020, 5 pages.
Vaswani, A., et al., "Attention is All You Need", Advances in Neural Information Processing Systems , NIPS 2017, arXiv:1706.03762v7, 12 pages.
Wang, H., et al., SpAtten: Efficient Sparse Attention Architecture with Cascade Token and Head Pruning, 27th IEEE International Symposium on High-Performance Computer Architecture, arXiv: 2012.09852V2, Jan. 4, 2021, 1-15, 15 pages.
Wu, C., et al., Streaming transformer-based acoustic models using self-attention with augmented memory, arXiv:2005.08042, May 16, 2020, 5 pages.
Zhang, S., et al., Streaming chunk-aware multihead attention for online end-to-end speech recognition, arXiv:2006.01712, May 21, 2020, 5 pages.

* cited by examiner

PROCESSING STREAMING DATA

CROSS-REFERENCE TO RELATED APPLICATIONS

This application is a U.S. National Stage application under U.S.C. 371 of International Application No. PCT/US2023/072614, filed on Aug. 22, 2023, which claims priority to U.S. Provisional Application No. 63/511,799 filed Jul. 3, 2023, U.S. Provisional Application No. 63/416,429 filed Oct. 14, 2022, and U.S. Provisional Application No. 63/401,046 filed Aug. 25, 2022, each of which is incorporated by reference in their entireties.

TECHNICAL FIELD

This disclosure pertains to systems, methods, and media for processing streaming data.

BACKGROUND

Attention, e.g., as implemented as an attention vector, has been a crucial component of machine learning algorithms and neural network architectures that have brought about gains in natural language processing, computer vision, speech and audio processing, and more. For example, attention has been implemented in transformer neural networks, which are used for natural language processing, e.g., to translate text from one language to another, output cogent blocks of text responsive to queries, and more. However, applying these algorithmic and neural network advances to streaming data, such as streaming audio data, is difficult due to the limited amount of data available in a streaming context.

NOTATION AND NOMENCLATURE

Throughout this disclosure, including in the claims, the terms "speaker," "loudspeaker" and "audio reproduction transducer" are used synonymously to denote any sound-emitting transducer (or set of transducers). A typical set of headphones includes two speakers. A speaker may be implemented to include multiple transducers (e.g., a woofer and a tweeter), which may be driven by a single, common speaker feed or multiple speaker feeds. In some examples, the speaker feed(s) may undergo different processing in different circuitry branches coupled to the different transducers.

Throughout this disclosure, including in the claims, the expression performing an operation "on" a signal or data (e.g., filtering, scaling, transforming, or applying gain to, the signal or data) is used in a broad sense to denote performing the operation directly on the signal or data, or on a processed version of the signal or data (e.g., on a version of the signal that has undergone preliminary filtering or pre-processing prior to performance of the operation thereon).

Throughout this disclosure including in the claims, the expression "system" is used in a broad sense to denote a device, system, or subsystem. For example, a subsystem that implements a decoder may be referred to as a decoder system, and a system including such a subsystem (e.g., a system that generates X output signals in response to multiple inputs, in which the subsystem generates M of the inputs and the other X-M inputs are received from an external source) may also be referred to as a decoder system.

Throughout this disclosure including in the claims, the term "processor" is used in a broad sense to denote a system or device programmable or otherwise configurable (e.g., with software or firmware) to perform operations on data (e.g., audio, or video or other image data). Examples of processors include a field-programmable gate array (or other configurable integrated circuit or chip set), a digital signal processor programmed and/or otherwise configured to perform pipelined processing on audio or other sound data, a programmable general purpose processor or computer, and a programmable microprocessor chip or chip set.

SUMMARY

Disclosed herein are techniques for processing streaming data. In some embodiments, a method for processing streaming data involves obtaining input data representative of a frame of streaming data. The method further involves identifying a query transformation, a key transformation, and a value transformation based on the input data for the frame of streaming data. The method further involves updating a query buffer, a key buffer, and a value buffer based on the identified query, key, and value transformations, such that the query buffer, the key buffer, and the value buffer are each configured to store parameters associated with previous frames of streaming data and the frame of streaming data. The method further involves retrieving one or more query frames from the updated query buffer to be used to process the input data. The method further involves determining a dot product of the retrieved one or more query frames and frames in the key buffer to determine a set of weights. The method further involves determining a weighted sum between the set of weights and frames in the value buffer. The method further involves utilizing the weighted sum to generate a streaming attention vector, wherein the streaming attention vector is usable by a network to generate a prediction associated with the streaming data.

In some examples, the network is a transformer network.

In some examples, the streaming data is streaming audio data.

In some examples, the prediction associated with the streaming data comprises a prediction of speech emotion associated with the streaming data.

In some examples, the prediction associated with the streaming data comprises identification of one or more features useful for provision to one or more downstream machine learning models. In some examples, the one or more features comprise identification of one or more speakers associated with the streaming data.

In some examples, the prediction associated with the streaming data comprises classification of one or more words or phonemes of the streaming data.

In some examples, at least one of the query buffer, the key buffer, or the value buffer is a circular buffer.

In some examples, updating the query buffer comprises appending a current query frame based on the query transformation to the query buffer; and discarding an oldest query frame in the query buffer. In some examples, the retrieved one or more query frames correspond to the discarded oldest query frame.

In some examples, the network comprises a plurality of layers, and wherein updating the query buffer comprises, for a first layer of the plurality of layers: appending a current query frame based on the query transformation to the query buffer; replacing a plurality of query frames in the query buffer with a plurality of lookahead query frames corresponding to future times; and discarding an oldest query frame in the query buffer. In some examples, the retrieved one or more query frames used to process the input block by the first layer of the plurality of layers comprise the current query frame and the plurality of lookahead query frames. In some examples, the plurality of lookahead query frames comprises two lookahead frames. In some examples, the retrieved one or more query frames used to process the input block by each of the plurality of layers other than the first layer is passed to a given layer by a preceding layer.

In some examples, updating the key buffer and updating the value buffer comprise: appending a current key frame based on the key transformation to the key buffer and discarding an oldest key frame from the key buffer; appending a current value frame based on the value transformation to the value buffer; and discarding an oldest value frame from the value buffer.

In some examples, wherein updating the key buffer and updating the value buffer comprise: appending a current key frame to the key buffer; replacing a plurality of key frames in the key buffer with a plurality of lookahead key frames based on the key transformation; discarding an oldest key frame from the key buffer; appending a current value frame to the value buffer; replacing a plurality of value frames in the value buffer with a plurality of lookahead value frames based on the value transformation; and discarding an oldest value frame from the value buffer.

In some examples, the network was trained by: performing an initial training using a first version of the network that does not utilize the query buffer, the key buffer, and the value buffer to store a subset of query frames, key frames, and value frames; and performing a subsequent training that modifies weights associated with the network. In some examples, the subsequent training is performed using a second version of the network that includes the query buffer, the key buffer, and the value buffer, and wherein performing the subsequent training comprises performing backpropagation using derivatives derived from the second version of the network. In some examples, the subsequent training is performed using the first version of the network, and wherein performing the subsequent training comprises: providing, data given block of training data, a series of time shifted segments to the first version of the network to generate a corresponding series of predicted outputs; aggregating the series of predicted outputs; determining a loss based on the aggregated series of predicted outputs; and updating weights associated with the first version of the network based on the loss.

Some or all of the operations, functions and/or methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented via one or more non-transitory media having software stored thereon.

At least some aspects of the present disclosure may be implemented via an apparatus. For example, one or more devices may be capable of performing, at least in part, the methods disclosed herein. In some implementations, an apparatus is, or includes, an audio processing system having an interface system and a control system. The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION OF EMBODIMENTS

Figure 1:
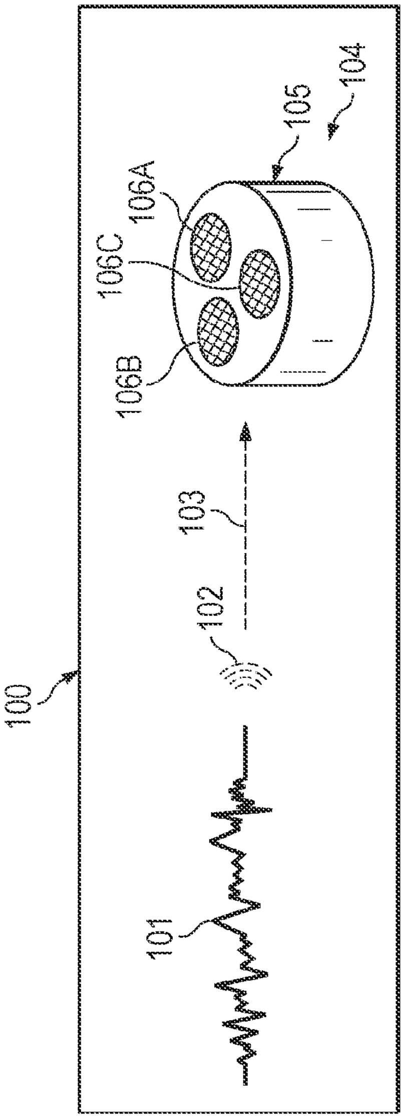
FIG. 1 is a diagram illustrating an example audio environment in accordance with some embodiments.

Neural networks and other machine learning models are being used to generate predictions related to data. For example, regarding audio data, a trained machine learning model may be used to categorize audio signals as being speech or noise, to perform speech recognition, to perform emotion detection on speech in the audio data, or the like. However, such networks may have difficulty with generating predictions for streaming data in which data arrives sequentially in real-time or in near real-time. For example, transformer networks have been utilized to perform speech recognition and text translation among other functions, utilizing a multi-head attention block that generates an attention vector based on all data. As a more particular example, using a conventional transformer network, an attention vector may be generated for a portion of an input string of speech or text that indicates context of the portion relative to previous and future portions of speech or text. However, this is not possible for streaming data, in which future data (i.e., a remaining portion of a sentence, speech that follows a given word or phrase) is not readily accessible.

Disclosed herein are techniques (e.g., systems, methods, and media) for implementing networks that utilize streaming attention. In particular, using the techniques described herein, an attention vector may be generated based on a window of streaming data, rather than based on all data as is conventionally done with conventional transformer networks. The attention vector may be generated using a multi-head streaming attention block. Similar to a conventional transformer network, a multi-head streaming attention block may be configured to generate an attention vector based on query, key, and value transformations. Query transformations may generally indicate a set of vectors for which attention is to be calculated, whereas value transformations may generally indicate a set of vectors against which attention is to be calculated. Accordingly, by performing a dot product multiplication of query by value, a set of un-normalized weights may be generated that indicate how attended each query is against the keys. The set of un-normalized weights may then be normalized using, e.g., a softmax function, and the normalized weights multiplied by the values to obtain an output. Unlike a conventional multi-head attention block of a conventional transformer network, the multi-head streaming attention block may be configured to maintain and update query, key, and value buffers on a frame-by-frame basis such that new query, key, and value transformations are updated in the buffers while old values are discarded. Unlike a conventional transformer network that utilizes all query data to generate an attention vector, as disclosed herein, a multi-head streaming attention block may use a window of query data to generate the attention vector.

In some embodiments, an attention vector may be generated using a frame-inference method, in which query, key, and value buffers are updated based on the current frame of streaming data and in which a single query frame is used to generate the attention vector. An example multi-head streaming attention block for implementing the frame-inference method is shown in and described below in connection with FIG. 6. Additionally or alternatively, in some embodiments, an attention vector may be generated using a block-inference method, in which query, key, and value buffers are updated based on the current frame of streaming data and one or more lookahead frames. The attention vector may be generated based on multiple query frames (e.g., the current query frame and one or more lookahead frames). An example multi-head streaming attention block (sometimes also referred to herein as a low-latency multi-head streaming attention block) for implementing the block-inference method is shown in and described below in connection with FIG. 9. Note that the frame-inference method may have reduced computational complexity relative to the block-inference method, whereas the block-inference method may have lower latency relative to the frame-inference method. Accordingly, a method may be selected based on computational capabilities of a computing device to be used to generate inferences, the type of streaming data to be used, or the like.

Note that, although the techniques disclosed herein are generally described with respect to streaming audio data, other types of streaming data are contemplated. In some embodiments, other types of streaming data, such as streaming text data, or the like, may be used.

A network trained to make predictions associated with streaming data may make any suitable predictions. For example, in an instance in which the streaming data is streaming audio data, that predictions may include real-time or near real-time predictions of speech recognition, emotion detection, speaker detection or identification, speech representational learning, or the like. In some embodiments, generating predictions in real-time or in near real-time may allow models to be updated without utilizing stored user data to generate the predictions, or without storing using data for longer than the time period required to generate the predictions. This may serve to protect user privacy by not storing, e.g., audio conferencing or video conferencing data.

FIG. 1 illustrates an example audio environment 100. FIG. 1 includes audio devices 104, which may be configured to capture audio signals 101 via multiple microphones (e.g., microphones **106*a*, 106*b*, and 106*c*). An example of such an audio device is a device for audio conferencing or video conferencing, e.g., that may be used in a conference room. Audio device 104 may include one or more processors 105. Processor(s) 105 may be configured to analyze the audio signals, and optionally, any other signals (e.g., video signals, data from motion sensors, etc.). Processor(s) 105 may be configured to generate speech analytics, e.g., to perform speech recognition, emotion recognition, speaker detection, etc. The speech analytics may be generated in real-time or in near real-time based on streaming audio data. Disclosed herein are techniques that may be performed by processor(s) 105 or one or more processor(s) communicatively coupled to processor(s) 105** (e.g., by processors of a server device or other coupled computing device) to perform or generate such speech analytics.

As discussed above, disclosed herein are techniques for implementing streaming attention. The techniques may be used in conjunction with various types of neural network architectures, such as a transformer network, a conformer network, or the like. Such a neural network may be trained, e.g., using a training set. Once trained, the network, which utilizes streaming attention as implemented via a multi-head streaming attention layer (described below in more detail) may be used at an inference stage to generate predictions for input streaming data. For example, the input streaming data may be streaming audio data (e.g., streaming speech signals, or the like). Predictions associated with streaming audio data may include real-time or near real-time speech recognition, speech emotion recognition, speaker detection or identification, speech representation learning, etc. In some embodiments, the streaming data may be streaming text data, video data, financial data, accelerometer data, electrical power usage data, or any other type of time-series data.

It should be understood that training a neural network configured to implement streaming attention may be performed by a different device than a device that utilizes a trained neural network for inference. For example, training may be performed by a first server device, and the trained neural network may be utilized for inference by an end user device (e.g., an audio or video conferencing device, a laptop, a desktop computer, etc.), a second server device, or the like. More detailed techniques for implementing streaming attention are shown in and described below in connection with FIGS. 4, 5, 6, 7, 8, 9, 10A, 10B, 11, and 12. Techniques for training a network that utilizes streaming attention are shown in and described below in connection with FIGS. 13, 14A, 14B, and 15.

Figure 2:
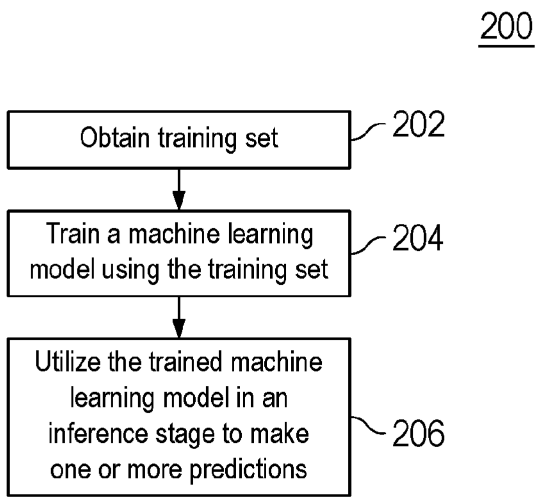
FIG. 2 is a flowchart of an example process for training and using a machine learning model in accordance with some embodiments.

FIG. 2 depicts a flowchart of an example process 200 for training and utilizing a trained machine learning model in accordance with some embodiments. The machine learning model may be one configured to implement streaming attention and to generate predictions, at an inference stage, regarding streaming data. Note that, in some embodiments, blocks of process 200 may be implemented by multiple devices. For example, training a machine learning model may be implemented by a first device or a first set of devices, and use of the machine learning model for inference may be implemented by a second device or a second set of devices. As another example, in some embodiments, training a model may be performed by one or more server devices, and inference may be performed by one or more client devices or end computing devices, such as a conferencing device, a laptop computer, a desktop computer, etc. In some embodiments, blocks of process 200 may be executed in an order other than what is shown in FIG. 2. In some embodiments, two or more blocks of process 200 may be executed substantially in parallel. In some embodiments, one or more blocks of process 200 may be omitted.

At 202, process 200 can obtain a training set. The training set may include training samples, where each training sample may include an input to the machine learning model and a corresponding ground truth prediction. For example, in an instance in which the machine learning model is to be trained to perform speech recognition of input speech signals, the training set may include training samples each comprised of a block of input audio signal including speech, and corresponding text indicative of the words included in the input audio signal.

At 204, process 200 can train a machine learning model using the training set. The machine learning model may be a transformer network, a conformer network, or the like. The machine learning model may have an architecture that includes a multi-head streaming attention layer or block, as described below in connection with FIGS. 5 and 6. Note that FIGS. 13, 14A, 14B, and 15 describe techniques for pre-training the model and subsequently fine-tuning the model to generate a trained model. Additionally, note that a trained machine learning model may be characterized by a set of weights (e.g., weights associated with different nodes and/or layers of the network), where the set of weights are the weight values at the conclusion of the training stage.

At 206, process 200 can utilize the trained machine learning model in an inference stage to make one or more predictions. The one or more predictions may be predictions related to a block of streaming data, such as a block of streaming audio data. For example, the one or more predictions may include speech recognition related to a block of streaming audio data, vocal emotion recognition related to a block of streaming audio data, speaker detection related to a block of streaming audio data, or the like. Note that block 206 may be executed by a device different from the device that executed block 204. For example, block 206 may be executed by an end client device, such as a mobile user device, a desktop computer, a conferencing device, or the like, whereas block 204 may be executed by a server device. As another example, block 206 may be executed by a cloud device or a server device different from a server device that performed training of the model at block 204. For example, a cloud device or a server device may receive a block of streaming data from a client device (e.g., a video or audio conferencing device) and may process the streaming data in the cloud to generate the one or more predictions. The one or more predictions may in some implementations be transmitted back to the client device.

Figure 3A:
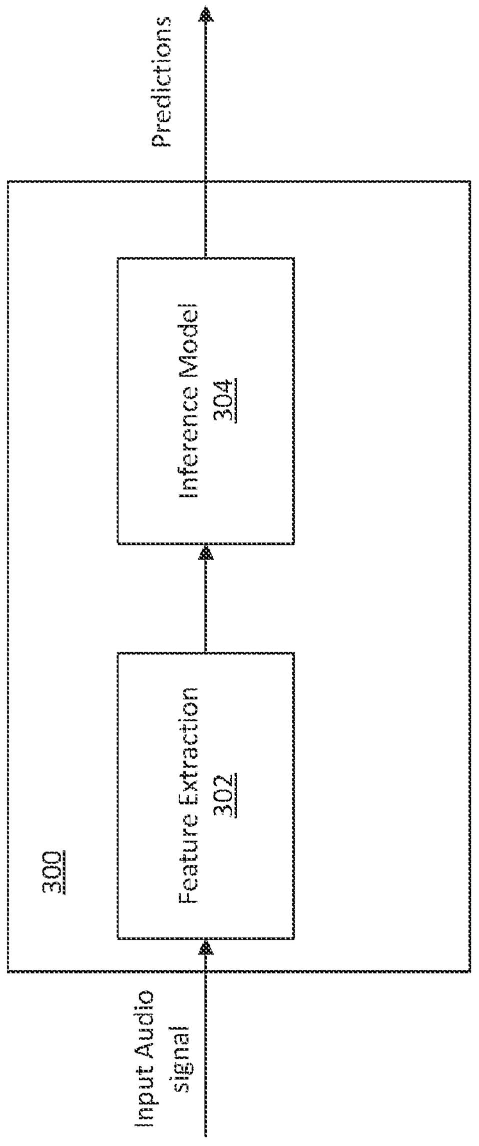
FIG. 3A is a flowchart of an example process for generating a prediction associated with an input signal in accordance with some embodiments.
Figure 3B:
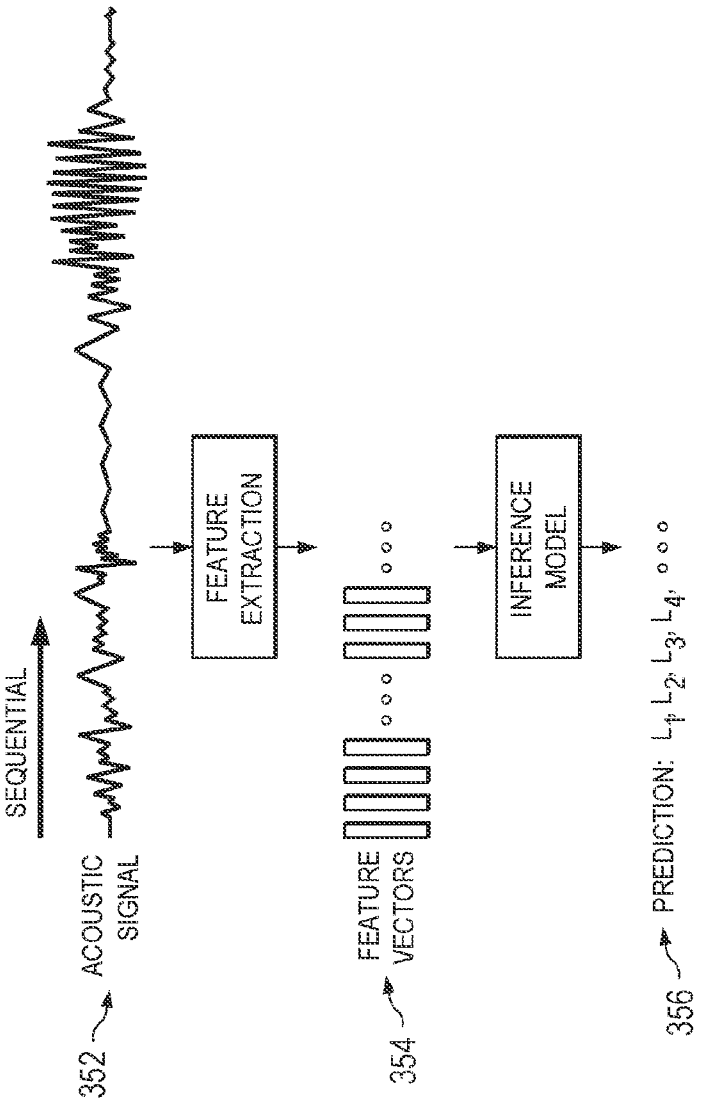
FIG. 3B is a diagram illustrating use of extracted features to generate a prediction in accordance with some embodiments.

FIGS. 3A and 3B illustrate the inference stage as applied to streaming data in accordance with some embodiments. Note that although FIGS. 2A and 2B generally depict streaming audio data, the techniques illustrated and described below may be applied to other types of streaming data.

Turning to FIG. 3A, components of an inference block 300 are depicted in accordance with some embodiments. As illustrated, an input audio signal may be provided to a feature extraction block 302. The input audio signal may be acquired from one or more microphones. The input audio signal may be streamed audio data such that the audio arrives sequentially in blocks, where each block includes a fixed number of samples. For example, inference block 300 may operate at a sampling rate of 16000 samples per second, and may receive 10 milliseconds (e.g., 160 samples) of audio at a time. Note that, in some systems, there may be a requirement in which one block of audio must be processed within the block time. For example, if audio is received in 10 millisecond frames, each frame must be processed within 10 milliseconds to output predictions at the same rate as the input frames. Feature extraction block may be configured to extract feature vectors associated with the input acoustic audio signal.

The extracted feature vectors may be provided to inference model 304. Inference model 304 may include the trained machine learning models that incorporate streaming attention layers or blocks, as described below. Inference model 304 may generate, as an output, one or more predictions associated with the input audio signal.

FIG. 3B depicts a diagram of extraction of feature vectors and provision of the feature vectors to the inference model in accordance with some embodiments. As illustrated, at 352, an input audio signal is provided to a feature extraction block. At 354, one or more feature vectors are extracted. The one or more feature vectors are provided to an inference model. At 356, the inference model generates one or more predictions associated with the input audio signal. Note that, as illustrated in FIG. 3B, the input audio signal is a sequential signal that may continue for any suitable duration of time, e.g., one second, ten seconds, one minute, ten minutes, thirty minutes, one hour, ten hours, etc. Predictions may be sequentially generated for each frame of the input audio signal. In FIG. 3B, the sequential stream of predictions are represented as $L_1$, $L_2$, $L_3$, etc., where $L_n$ represents the prediction associated with the $n^{th}$ frame.

An inference model used to generate predictions may include various blocks, or layers. For example, the inference model may include a positional encoding layer configured to embed position information associated with a block of streaming data. For example, the positional encoding layer may indicate position information of particular words or speech tokens within a stream of data. As a more particular example, the position information may indicate absolute position (e.g., relative to the beginning of the stream of data) or relative (e.g., relative to a current time point). As a more particular example, position information may be combined with extracted features to generate input data provided to a transformer layer. The transformer layer may include a streaming multi-head attention block, as shown in and described below in connection with FIG. 5. The output of the transformer layer may then be provided to a linear layer, and subsequently to a softmax layer. The linear layer may be configured to perform a linear transformation of the output of the transformer layer. The output of the softmax layer may be a prediction associated with the block of streaming data. In other words, the softmax layer may be configured to assign probabilities to a set of candidate predictions, a prediction of which may then be selected based on the probabilities assigned by the softmax layer.

Figure 4:
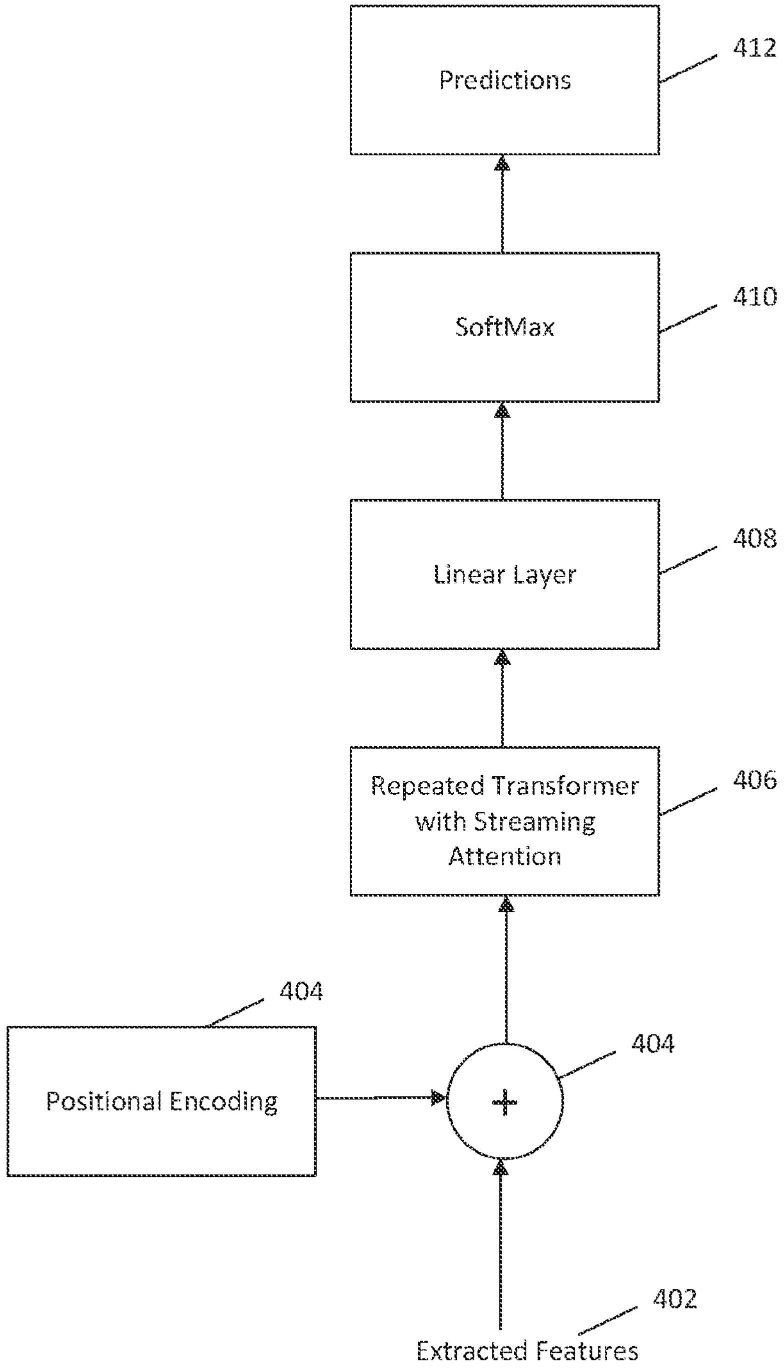
FIG. 4 is a diagram of blocks of a portion of a transformer network that utilizes streaming attention in accordance with some embodiments.

FIG. 4 is a diagram of an example implementation of an inference model in accordance with some embodiments. As illustrated, extracted features 402 and position information generated by positional encoding layer 404 may be combined at 404 to generate transformer input data. The transformer input data may be provided to a repeated transformer with streaming attention block 406, which may be configured to generate and/or utilize a streaming attention vector. The output the transformer with streaming attention block 406 may be provided to a linear layer 408, which may be configured to perform a linear transformation on an output of the transformer with streaming attention layer. The output of the linear layer may be provided to softmax layer 410, which may be configured to determine probabilities associated with a set of candidate predictions. For example, in an instance in which the inference model is configured to perform speaker detection of a set of N candidate speakers, the softmax layer may assign probabilities that a block of streaming audio data is associated with each of speakers 1, . . . N. Prediction block 412 may then be configured to select a prediction from the set of candidate predictions based on the probabilities assigned by softmax layer 410.

Figure 5:
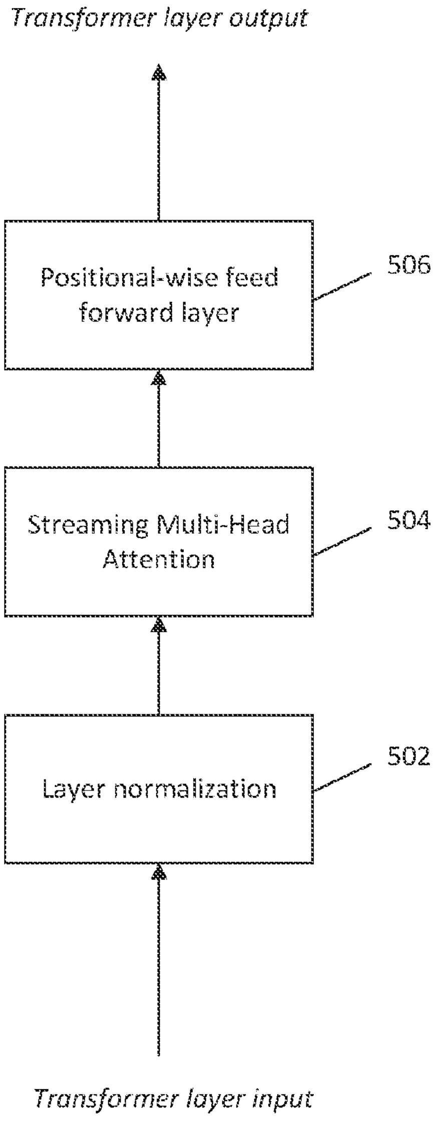
FIG. 5 depicts a streaming attention layer of a transformer network in accordance with some embodiments.

FIG. 5 illustrates an example implementation of a transformer layer of an inference model in accordance with some implementations. As illustrated, an input may be provided to a layer normalization block 502. Note that layer normalization block 502 is optional, and may be omitted. The output of layer normalization block 502 (or the input, if layer normalization block 502 is omitted) may be provided to a streaming multi-head attention block 504. Streaming multi-head attention block 504 may be configured to generate an attention vector based on a block of streaming data. In particular, and as described below in more detail in connection with FIGS. 6 and 9, streaming multi-head attention block 504 may generate the attention vector based on query, key, and value transformation values obtained from corresponding query, key, and value buffers. Each buffer may be a circular buffer configured to update and/or replace values based on the sequential streaming data, thereby allowing the attention vector to be generated based on recent streaming data. Example implementations of a streaming multi-head attention block are shown in and described below in connection with FIGS. 6 (e.g., configured to implement a frame-inference method of streaming attention) and 9 (e.g., configured to implement a block-inference method of streaming attention). The output of streaming multi-head attention block 504 may be provided to positional-wise feed forward layer 506, which may be configured to generate a transformer layer output, which may in turn be provided to a linear layer, as shown in and described above in connection with FIG. 4.

In some embodiments, a multi-head streaming attention block may include a query buffer, a key buffer, and a value buffer. Each of the query buffer, key buffer, and value buffer may be configured to store values associated with frames of streaming data, such that the query buffer, key buffer, and value buffer are updated based on sequential frames. For example, for a given frame of streaming data, a query transformation, a key transformation, and a value transformation may be identified based on input data for the frame of streaming data. Note that, in some embodiments, any of the query transformation, key transformation, and value transformation may be matrices. The query buffer, key buffer, and value buffer may be updated based on the identified query, key, and value transformations. For example, the transformations associated with the current frame may be added to the buffer while older transformations are removed from the buffer. In some implementations, each buffer may be a circular buffer. In some embodiments, one or more query frames may be retrieved from the updated query buffer. A dot product may be determined based on the retrieved one or more query frames and frames in the key buffer to determine a set of weights. The set of weights may be utilized to determine a streaming attention vector.

Figure 6:
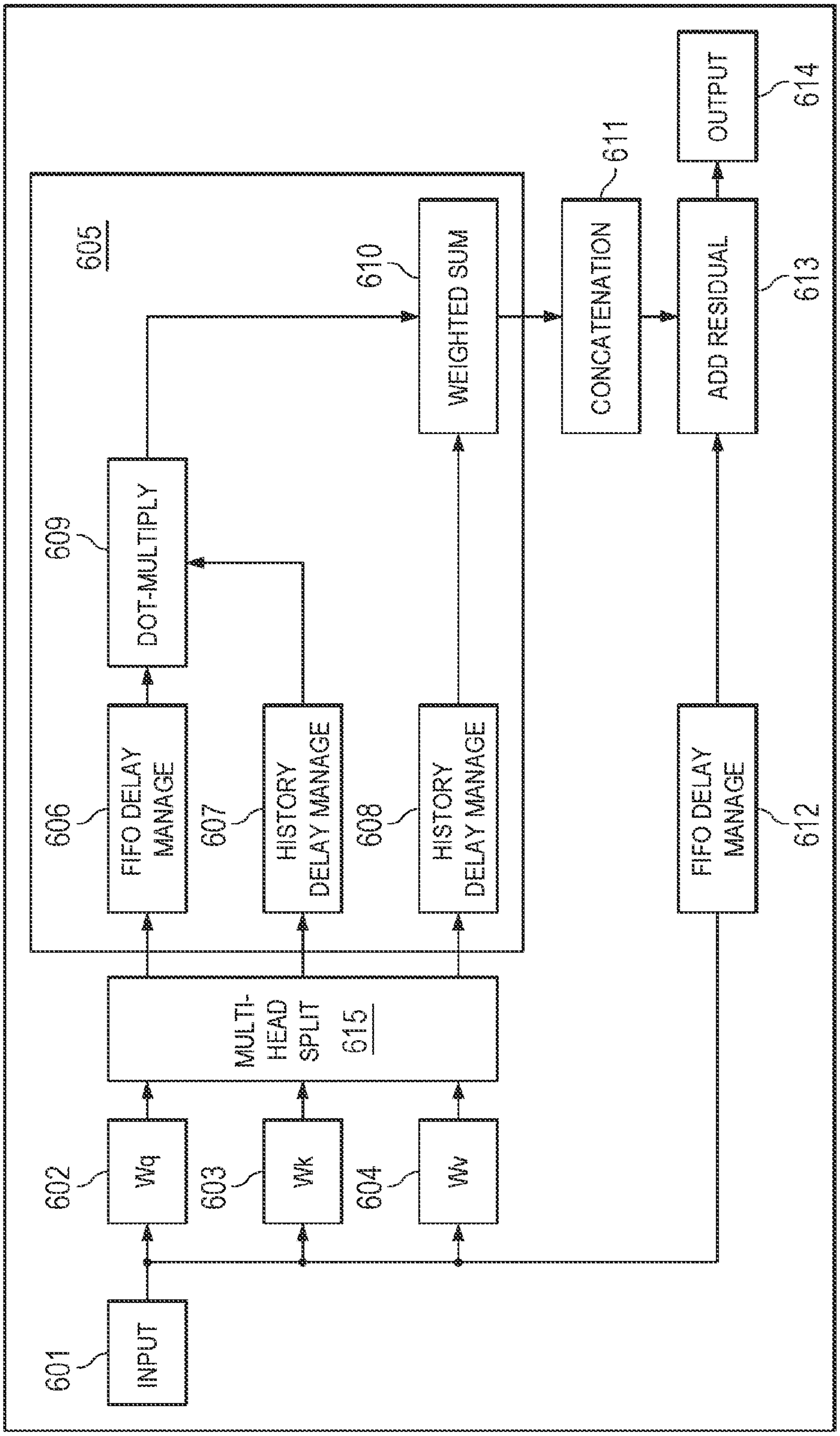
FIG. 6 depicts components of a multi-head attention layer in accordance with some embodiments.

FIG. 6 depicts an example implementation of a multi-head streaming attention block in accordance with some embodiments. The multi-head streaming attention block shown in FIG. 6 may be used to implement a frame-inference method of streaming attention. As illustrated, an input 601 is provided. Input 601 may correspond to a frame of streaming data (e.g., a frame of streaming audio data). Input 601 is provided to query projection 602, key projection 603, and value projection 604. Each of query projection 602, key projection 603, and value projection 604 may generate a linear projection of input 601 to query, key, and value spaces, respectively. Projections from query projection 602, key projection 603, and value projection 604 may be provided to multi-head attention split 615. Conventionally, a dot-product multiplication is determined between a query value and all key frames. However, to perform streaming inference, a dot-product multiplication is determined using delayed query and keys. Delay of the query values is performed by first-in, first-out (FIFO) delay management block 606, and delay of the key values is performed by history delay management block 607. Note that an example implementation of FIFO delay management block 606 is shown in and described below in connection with FIG. 7, and an example implementation of history delay management block 607 is shown in and described below in connection with FIG. 8. Dot-multiplication of the delayed query transformation and the delayed key transformation is performed by dot-multiplication block 609. The output of dot-multiplication block 609 is a set of weights. A delayed version of the value transformation is generated by history delay management block 608. A weighted sum is generated using the delayed value transformation and the set of weights by weighted sum block 610. Note that block 605 may be repeated for each head of the multi-head streaming attention block. Outputs of each head are concatenated by concatenation block 611. A delayed version of input 601 is generated by FIFO delay management block 612, and the output of the delayed input and the concatenated sums are provided to add residual block 613. The output 614 corresponds to the outputs of the different heads of the multi-head attention layer with the delayed version of the residual.

A FIFO delay manager may be used to delay query transformations and inputs. A FIFO delay manager may be configured to attach a current frame representation (e.g., a current input frame, as in the case of FIFO delay manager block 612 of FIG. 6, or a current query projection, as in the case of FIFO delay management block 606 of FIG. 6) to a front of a stack, and discard the last frame of the stack, thereby making the FIFO delay manager operate as a queue. In some embodiments, the queue may be configured as a circular buffer such that older frames are deleted and/or re-written.

Figure 7:
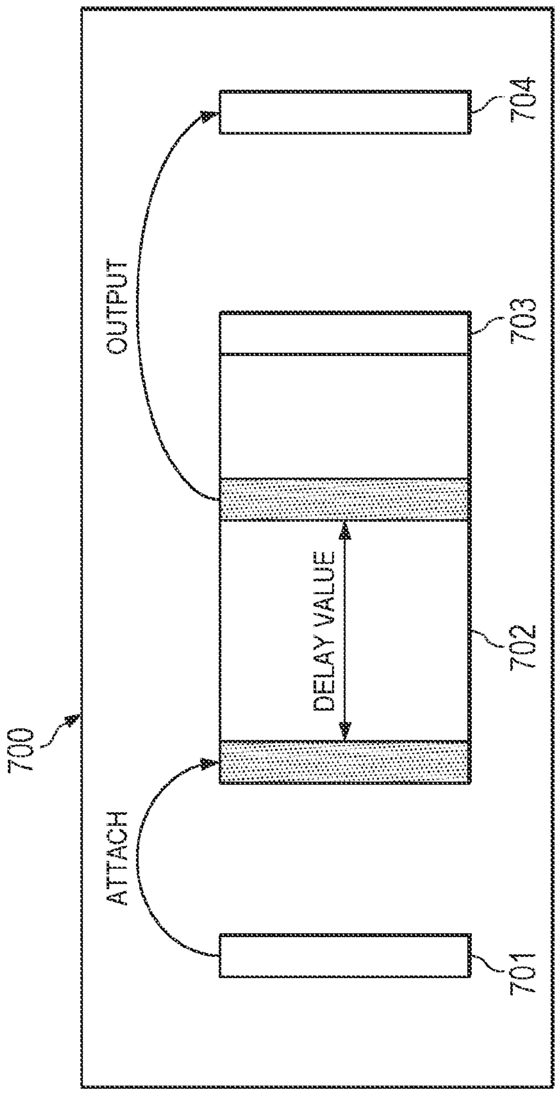
FIG. 7 depicts operation of a first-in, first-out (FIFO) delay manager in accordance with some embodiments.

FIG. 7 illustrates an example implementation of a FIFO delay management block 700 in accordance with embodiments. In some embodiments, FIFO delay management block 700 may be implemented as FIFO delay management blocks 606 and/or 612. As illustrated, an input frame 701 may be attached at the front of a delay line 702. In some embodiments, delay line 702 may operate with a fixed amount of memory (e.g., as implemented using a circular buffer and/or a queue) such that when a new frame (e.g., input frame 701) is added to the head of delay line 702, and an old frame (e.g., old frame 703) is discarded. Output frame 504 may be determined based on the query delay value. In some embodiments, output frame 504 may be the same as discarded frame 503 to cause the amount of memory occupied by delay line 502 to be minimized.

A history delay management block may be configured to generate delayed versions of the value and key transforms, as shown in and described above in connection with FIG. 6. Unlike the FIFO delay management block, a history delay management block may be configured to discard an oldest frame, and then output the entire remaining stack rather than just one selected frame.

Figure 8:
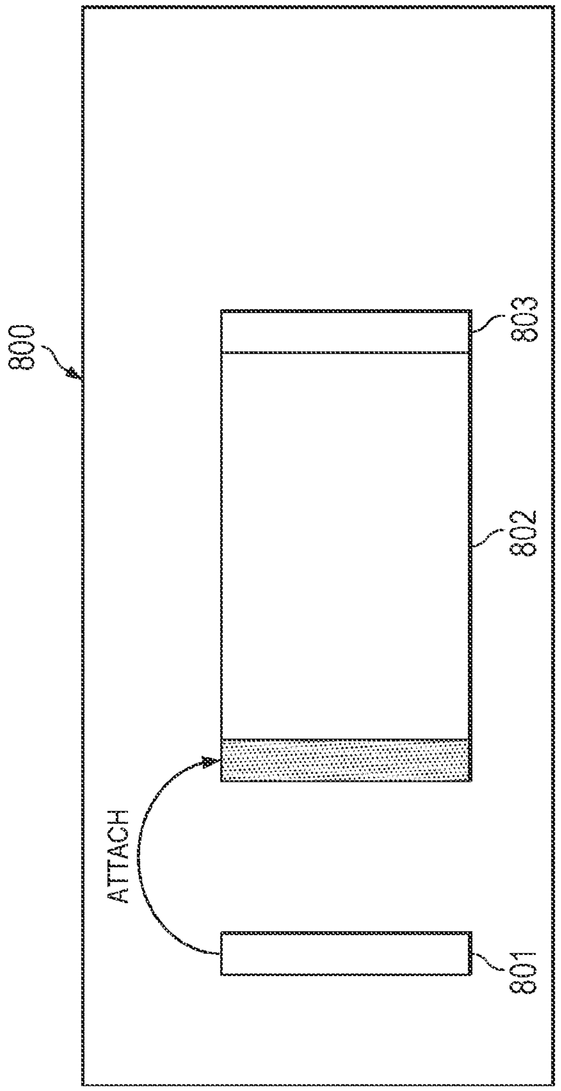
FIG. 8 depicts operation of a history delay manager in accordance with some embodiments.

FIG. 8 illustrates an example implementation of a history delay management block 800 in accordance with some embodiments. In some embodiments, history delay management block 800 may be implemented as history delay management blocks 607 and/or 608, as shown in and described above in connection with FIG. 6. As illustrated, an input frame 801 may be attached at the front of delay line 802. Delay line 802 may be implemented as a circular buffer and/or a queue. To operate the delay line with the fixed amount of memory, when input frame 801 is added to the front of delay line 802, an oldest frame 803 is discarded. Note that the output of history delay management block 800 includes all the frames of delay 802 after the input frame is appended and oldest frame 803 is discarded.

In the multi-head attention layer shown in and described above in connection with FIG. 6, a current query block is dot-multiplied with all key blocks for a given frame. However, for a network with multiple layers, this may lead to a longer latency, which may cause problems when generating predictions associated with streaming data. For example, given a six layer transformer network operating on two frames of audio (e.g., one lookahead frame and one current frame), given 20 millisecond frame durations, the total latency of the six layers may be 2*20 milliseconds*6 layers, or 240 milliseconds. Disclosed herein is a low-latency implementation of a multi-head streaming attention block configured to generate a streaming attention vector using the block-inference method. Rather than multiplying a query block of a current frame with all key blocks, multiple query blocks (e.g., a current query block and N lookahead blocks, where N is 2, 3, etc.) may be multiplied with all key blocks. The number of lookahead blocks N may be the length of a FIFO delay management block (e.g., the length of the delay line). For each successive layer of the transformer, the input may be provided from the previous layer, where all future blocks may be replaced with new versions of the lookahead blocks generated from the previous layer. Replacement of future blocks based on outputs of previous layers may prevent latency from accumulating. Given the example described above of audio frames of 20 milliseconds duration and a six layer transformer, a multi-head streaming attention block that considers two frames—one current frame and one lookahead frame—may have a latency of 2*20 milliseconds, or 40 milliseconds, rather than the 240 milliseconds latency associated with use of the multi-head attention layer shown in and described above in connection with FIG. 6.

Figure 9:
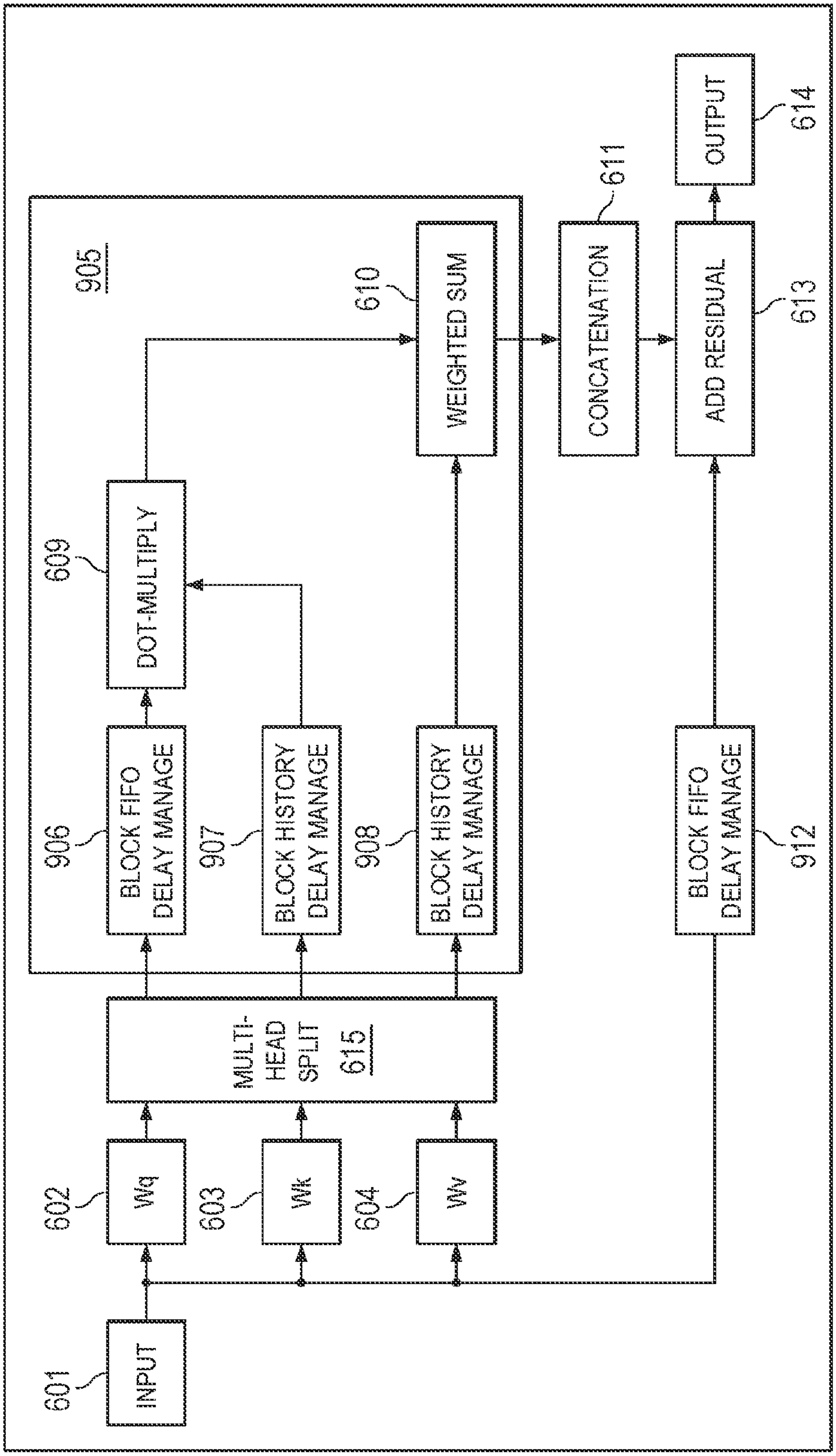
FIG. 9 depicts components of a low-latency multi-head attention layer in accordance with some embodiments.

FIG. 9 depicts an example implementation of a low-latency multi-head streaming attention block, which may be used to implement the block-inference method, in accordance with some embodiments. Many components of the low-latency multi-head attention layer depicted in FIG. 9 are similar to corresponding components of the multi-head attention layer depicted in FIG. 6. However, unlike what is shown in FIG. 6, the FIFO delay management blocks and the history delay management blocks are implemented as block delay blocks. For example, FIFO delay management blocks 606 and 612 are replaced by block FIFO delay management blocks 906 and 912, and history delay management blocks 607 and 608 are replaced by block history delay management blocks 907 and 908.

A block FIFO delay management block (e.g., block FIFO delay management blocks 906 and 912) may be used to identify delayed query and input blocks. A first version of the block FIFO delay management block may be used for the first layer of a network, where in the first version, an incoming input frame is appended to the delay line, and an oldest frame is discarded. The output for the first frame may be multiple frames, e.g., a current frame and N lookahead frames, where N is 1, 2, 3, 4, etc. frames. A second version of the block FIFO delay management block may be used for subsequent layers of the network, where an input to the delay line is the same as the output. Propagating the input to the output may prevents latency from accumulating throughout successive layers of the transformer network.

Figure 10A:
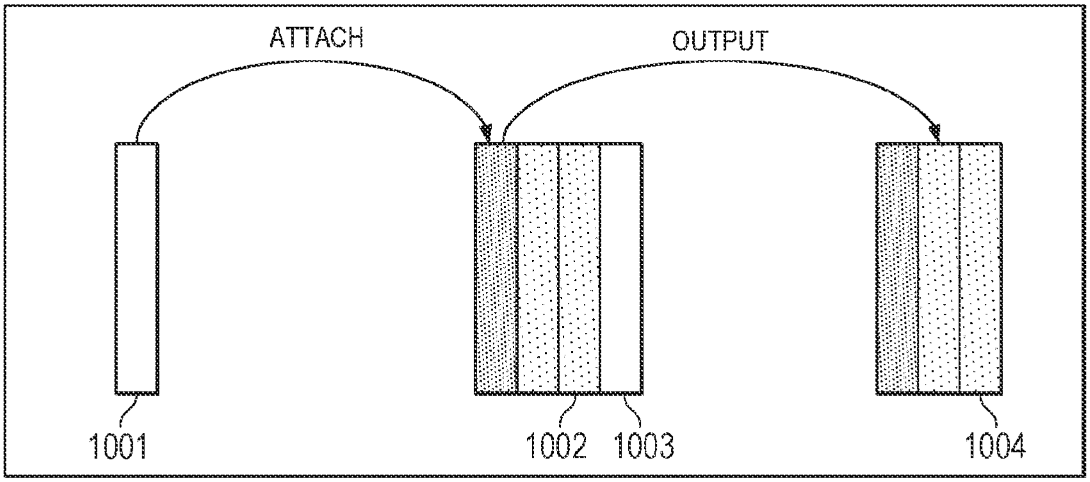
FIGS. 10A and 10B depict operation of a FIFO delay manager that may be used in connection with a low-latency multi-head attention layer in accordance with some embodiments.
Figure 10B:
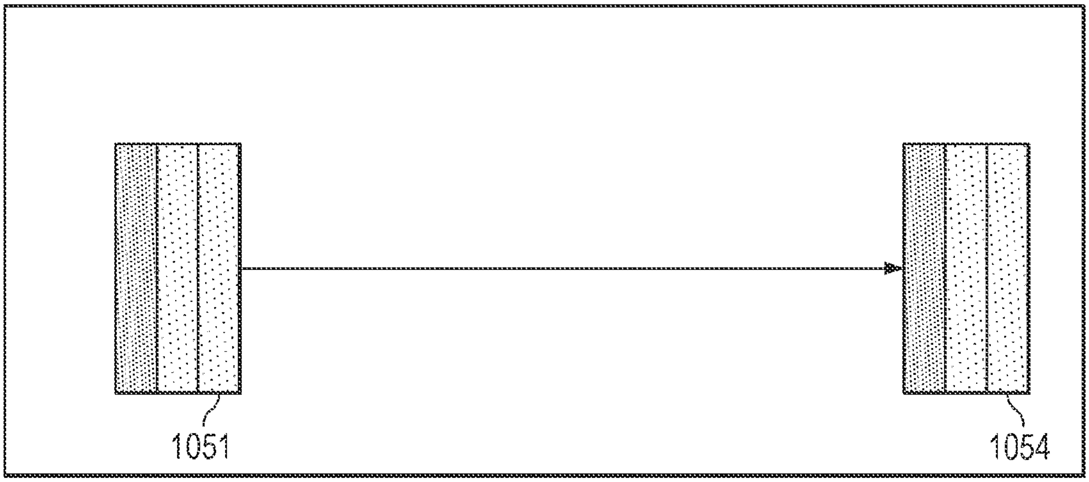

FIG. 10A illustrates an example implementation of a block FIFO delay management block that may be used in connection with a first layer of a network in accordance with some embodiments. As illustrated, a current frame 1001 is appended to a delay line 1002. Delay line 1002 may be implemented as a circular buffer, a queue, etc. An oldest frame 1003 is discarded from the end of delay line 1002. The output 1004 is all of the frames of the delay line after discarding oldest frame 1003. FIG. 10B illustrates an example implementation of a block FIFO delay management block that may be used in connection with subsequent layers of the network in accordance with some embodiments. As illustrated, the output 1054 is the same as the input 1051.

It should be understood that although the delay line illustrated in FIGS. 10A and 10B include a current frame and two lookahead frames, this is merely an example. In some embodiments, a delay line may be configured to operate with a current frame and N lookahead frames, where N is 1, 2, 4, 5, etc. Regardless, for a low-latency implementation of a multi-head streaming attention block, the block FIFO delay management block may be configured to output a number of frames that corresponds to the current frame plus N lookahead frames.

The block history delay management block may be used to maintain buffers for key and value transforms in a low-latency multi-head attention layer. A block history delay management block may be configured to append and/or replace a set of frames (e.g., a current frame and N lookahead frames) in a delay line and discard an oldest frame from the delay line. For example, a current frame may be appended to the delay line, and the N lookahead frames may replace N frames in the delay line. To operate a fixed memory, an oldest frame may be discarded from the delay line.

Figure 11:
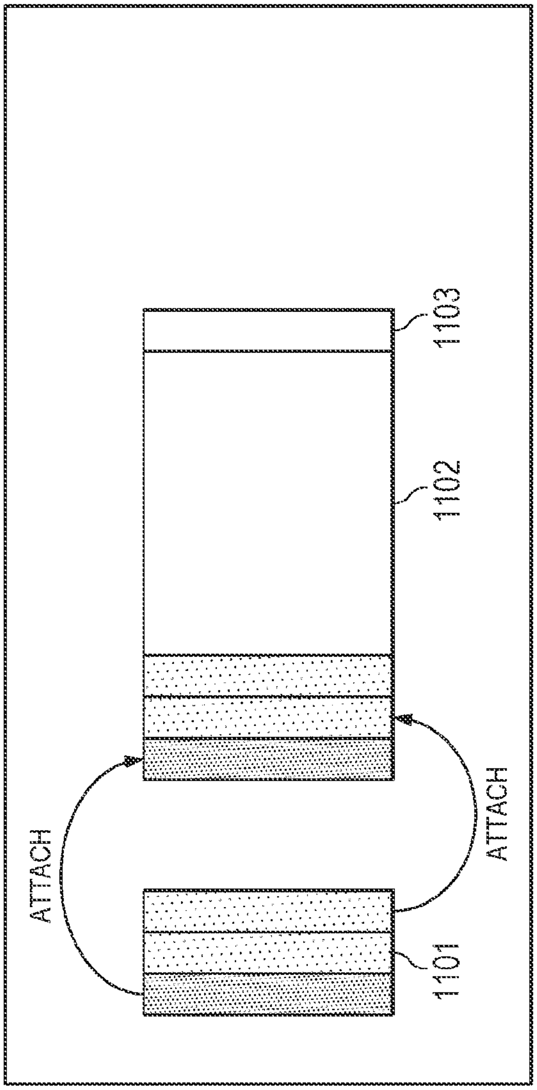
FIG. 11 depicts operation of a history delay manager that may be used in connection with a low-latency multi-head attention layer in accordance with some embodiments.

FIG. 11 illustrates an example implementation of a block history delay management block that may be used in some implementations of a low-latency multi-head streaming attention block in accordance with some embodiments. As illustrated, a set of frames 1101 may include a current frame and N lookahead frames. In the example shown in FIG. 11, N is two, and set of frames 1101 includes a total of three frames. The current frame is appended to delay line 1102, and the two lookahead frames replace two frames in delay line 1102. An oldest frame 1103 is discarded. After updating the delay line (e.g., a circular buffer or queue), the key and/or value transforms indicated in the updated delay line may be used to generate a set of weights and/or a weighted sum, as shown in and described above in connection with FIG. 9.

In some embodiments, an attention vector may be generated on a frame-by-frame basis for streaming data. For example, at inference time, an attention vector may be generated based on a window of input frames rather than all of the input frames (e.g., as conventionally used to generate an attention vector for non-streaming data). In some embodiments, an attention vector may be generated by a multi-head streaming attention block that manipulates time delay, generally referred to herein as a "frame-inference method". For example, as shown in FIG. 6, such an implementation may utilize a FIFO delay management block to delay query transformation frames and a history delay management block to delay key and value transformation frames. The multi-head streaming attention block may then be stacked for each layer to generate an attention vector. As another example, as shown in FIG. 9, an attention vector may be generated by a multi-head streaming attention block that lowers latency by preventing latency from stacking across multiple layers, generally referred to herein as a "block-inference method." As shown in and described above in connection with FIG. 9, using the block-inference method, a lookahead frame may be inferred for each layer to prevent latency accumulation.

Regardless of whether a frame-inference method or a block-inference method is used, the attention vector may be generated on a frame-by-frame basis and by updating buffers associated with query, key, and value transformations (e.g., matrices). For example, for each frame of streaming data, query, key, and value transformations may be identified based on input data associated with the frame. The query, key, and value buffers may be updated based on the query, key, and value transformations such that the query, key, and value buffers may be configured to store values associated with previous frames of streaming data. After updating the buffers, one or more query frames may be retrieved from the updated query buffer to process the input data. For example, in the frame-inference method, one query frame may be used to process the input data, whereas in the block-inference method, multiple query frames may be used (e.g., corresponding to a current query frame and one or more lookahead frames). A dot product may be determined for the one or more query frames and the frames in the key buffer to determine a set of weights. A weighted sum may then be determined using the set of weights and frames in the value buffer. The weighted sum may then be utilized to determine a streaming attention vector, e.g., by applying a softmax function to the weighted sum. The streaming attention vector may then be usable to generate a prediction associated with the streaming data.

Figure 12:
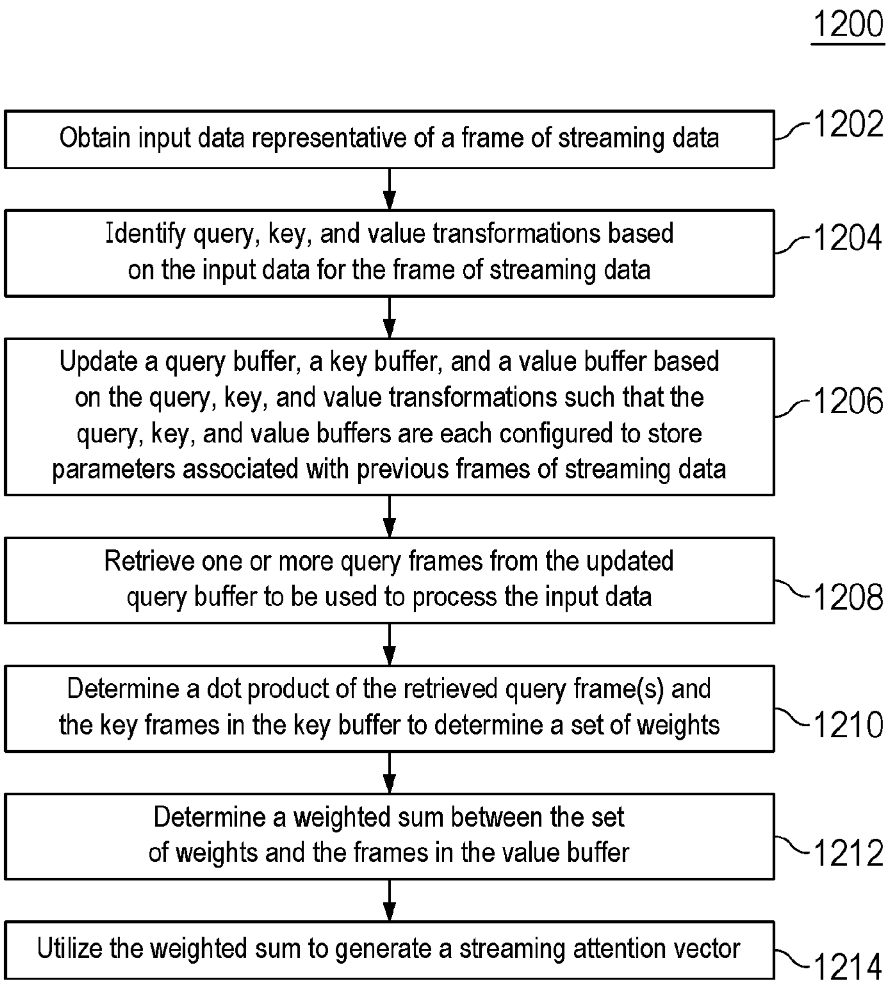
FIG. 12 is a flowchart of an example process for generating a streaming attention vector in accordance with some embodiments.

FIG. 12 is a flowchart of an example process 1200 for generating a streaming attention vector. As illustrated, blocks of process 1200 may be executed by one or more control systems and/or processors, e.g., of a server device, a video or audio conferencing device, a laptop device, etc. In some embodiments, blocks of process 1200 may be executed in an order other than what is shown in FIG. 12. In some embodiments, two or more blocks of process 1200 may be executed in an order other than what is shown in FIG. 12. In some embodiments, one or more blocks of process 1200 may be omitted.

Process 1200 may begin at 1202 by obtaining input data representative of a frame of streaming data. The frame of streaming data may be obtained by a laptop device, a desktop computing device, an audio or video conferencing device, or the like. The streaming data may include streaming audio data acquired by one or more microphones. The streaming data may include speech or other audio data for which a prediction is to be made by a network, e.g., a transformer network. Note that the input data representative of the frame of streaming data may include one or more extracted features associated with the frame, positional encodings associated with the frame, or the like.

At 1204, process 1200 may identify query, key, and value transformations based on the input data for the frame of streaming data. Query, key, and value transformations may be in the format of query, key, and value matrices in some embodiments. In some implementations, query, key, and value transformations may be identified using techniques implemented by non-streaming networks, such as non-streaming transformer networks.

At 1206, process 1200 can update a query buffer, a key buffer, and a value buffer based on the query, key, and value transformations. The query, key, and value buffers may each be configured to store parameters associated with previous frames of streaming data. For example, in the frame-inference method, the buffers may each be updated based on parameters associated with the current frame, as shown in and described above in connection with FIGS. 6, 7, and 8. As another example, in the block-inference method, the buffers may each be updated based on parameters associated with the current frame and one or more lookahead frames, as described above in connection with FIGS. 9, 10, and 11.

At 1208, process 1200 can retrieve one or more query frames from the updated query buffer to be used to process the input data. For example, using the frame-inference method, one query frame may be retrieved, as shown in and described above in connection with FIG. 7. As another example, using the block-inference method, multiple query frames may be retrieved, as shown in and described above in connection with FIGS. 10A and 10B.

At 1210, a dot product of the retrieved query frame(s) and key frames in the key buffer may be determined to generate a set of weights. In the frame-inference method, the dot product may include a dot product of a single retrieved query frame with key frames in the key buffer. Using the block-inference method, the dot product may include a dot product of multiple retrieved query frames with key frames in the key buffer.

At 1212, a weighted sum may be determined between the set of weights determined at block 1210 and frames in the value buffer. The weighted sum may correspond to an un-normalized attention vector.

Note that blocks 1208-1212 may be repeated for each layer of the network. For example, for a six layer transformer network, blocks 1208-1212 may be repeated for each of the six layers. Each of blocks 1208-1212 may be performed by a multi-head streaming attention block (e.g., as shown in and described above in connection with FIGS. 6 and/or 9), where each layer is associated with a different head.

At 1214, the weighted sum may be used to generate a streaming attention vector. For example, the un-normalized streaming attention vector generated at block 1212 may be normalized by applying the un-normalized streaming attention vector to a linear layer and/or a softmax layer as shown in and described above in connection with FIG. 4. The output of the softmax layer may be a normalized streaming attention vector which may be used to generate one or more predictions associated with the frame of streaming data.

Figure 13:
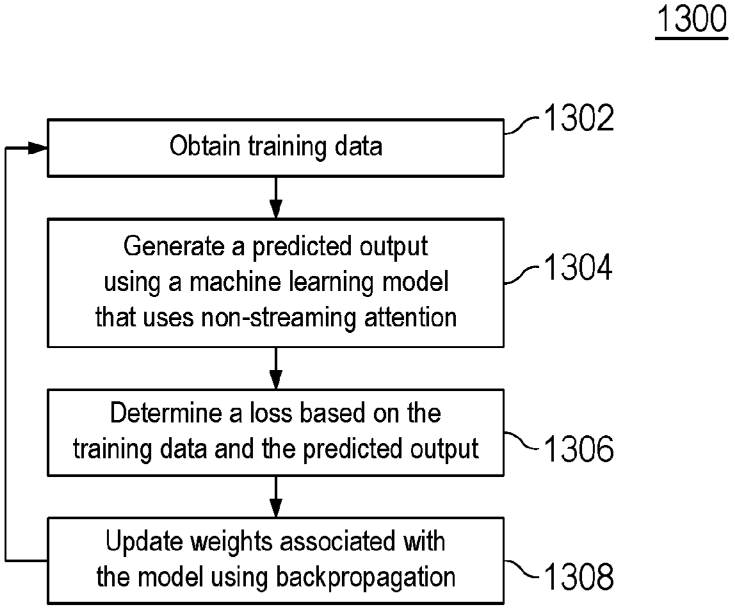
FIG. 13 is a flowchart of an example process for pre-training a network in accordance with some embodiments.

In some embodiments, a network that utilizes streaming attention (e.g., by implementing a multi-head streaming attention block, as shown in and described above in connection with FIGS. 6, 9, and 12) may be trained using a multi-stage training process. For example, the network may be trained by first training a version of the network that utilizes non-streaming attention. As a more particular example, such a network may utilize a non-streaming multi-head attention block that does not use query, key, and value buffers. In such a non-streaming network, an attention vector may be generated using all frames of data rather than windows of frames. The weights of such a network may be updated based on backpropagation and/or any other suitable training techniques. FIG. 13 is an example of a flowchart for performing pre-training on a network for streaming attention.

After pre-training the version of the network without streaming attention, the model may be fine-tuned using a fine-tuning stage of training. Fine-tuning the network may be performed using different techniques. For example, as shown in and described below in connection with FIG. 14A, fine tuning may be performed by using backpropagation to update weights associated with a streaming attention kernel of a second version of the network that includes query, key, and value buffers. As another example, as shown in and described below in connection with FIG. 14B, fine tuning may be performed by providing a series of time shifted segments to the version of the network without streaming attention and updating weights based on an aggregated set of predictions associated with the time shifted segments.

FIG. 13 is a flowchart of an example process 1300 for pre-training a streaming attention network using a version of the network that does not include streaming attention block(s). Blocks of process 1300 may be implemented by one or more control systems and/or processors of a device such as a server device or other computing device suitable for training a model. In some embodiments, blocks of process 1300 may be executed in an order other than what is shown in FIG. 13. In some embodiments, two or more blocks of process 1300 may be executed substantially in parallel. In some embodiments, one or more blocks of process 1300 may be omitted.

At 1302, process 1300 may obtain training data. The training data may of the same type as data that a trained network configured to generate predictions for streaming data is configured to take as inputs. For example, in an instance in which the trained network is configured to operate on streaming audio data, the training data may correspond to frames of audio data. As a more particular example, in an instance in which the trained network is to be configured to generate predictions related to speech in streaming audio data, the training data may include frames of speech audio data.

At 1304, process 1300 may generate a predicted output using a machine learning model that uses non-streaming attention. For example, the machine learning model may be a conventional transformer network that does not include a multi-head streaming attention block. As a more particular example, rather than generating an attention vector based on a window of query frames, the machine learning model may generate an attention vector based on all query frames.

At 1306, process 1300 may determine a loss based on the training data and the predicted output. For example, the training data may include a corresponding ground truth output label, and the loss may be determined based on the difference between the predicted output and the ground truth output label.

At 1308, process 1300 may update weights associated with the model using backpropagation. Blocks 1302-1308 may be repeated until a stopping criterion is reached for pre-training of the network. For example, the stopping criterion may include the loss being less than a predetermined threshold, the weights changing after each iteration by less than a predetermined threshold, etc.

Figure 14A:
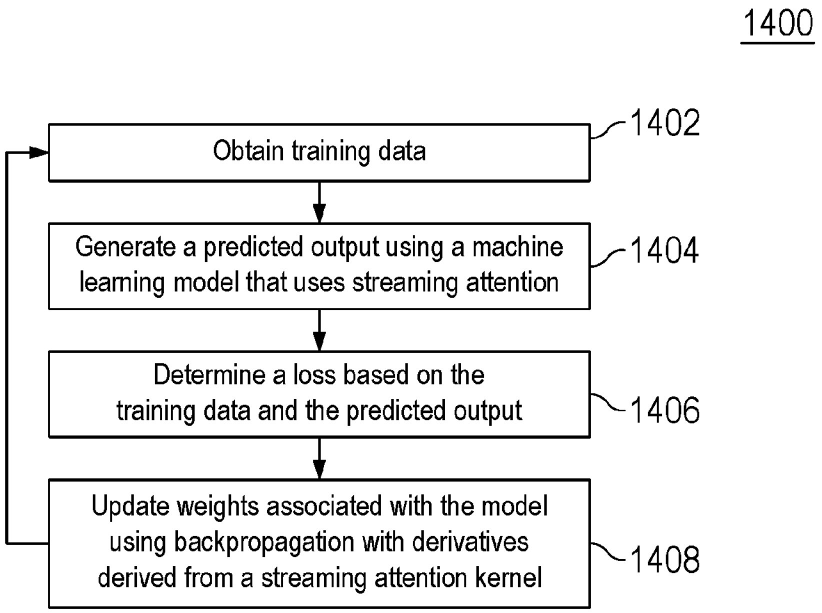
FIG. 14A is a flowchart of an example process for fine tuning a network that has been pre-trained using a custom kernel in accordance with some embodiments.

FIG. 14A is a flowchart of an example process 1400 for fine-tuning a model configured to operate on streaming data to generate a streaming attention vector after a pre-training process of the model has been completed (e.g., the pre-training process shown in and described above in connection with FIG. 13). In some embodiments, blocks of process 1400 may be executed by one or more control systems or processors of e.g., a server device or other computing device suitable for training a model. In some implementations, the computing device that executes process 1400 may be the same as the computing device that executes process 1300, or a different computing device. In some embodiments, blocks of process 1400 may be executed in an order other than what is shown in FIG. 14A. In some embodiments, two or more blocks of process 1400 may be executed substantially in parallel. In some embodiments, one or more blocks of process 1400 may be omitted.

At 1402, process 1400 may obtain training data. The training data may of the same type as data that a trained network configured to generate predictions for streaming data is configured to take as inputs. For example, in an instance in which the trained network is configured to operate on streaming audio data, the training data may correspond to blocks of audio data. As a more particular example, in an instance in which the trained network is to be configured to generate predictions related to speech in streaming audio data, the training data may include blocks of speech audio data.

At 1404, process 1400 may generate a predicted output using a machine learning model that uses streaming attention. For example, the machine learning model may have a multi-head streaming attention block as shown in and described above in connection with FIGS. 6 and 9. The machine learning model may be configured to generate the predicted output by generating a streaming attention vector using a window of frames rather than all previous frames.

At 1406, process 1400 may determine a loss based on the training data and the predicted output. For example, the training data may include a corresponding ground truth output label, and the loss may be determined based on the difference between the predicted output and the ground truth output label.

At 1408, process 1400 may update weights associated with the model using backpropagation with derivatives derived from a streaming attention kernel. In some embodiments, the forward portion and derivatives for training may be determined from derived equations. The forward portion and the derivatives may be implemented using a multi-threaded framework (e.g., using the Compute Unified Device Architecture (CUDA) framework, or other similar multi-threaded framework). Note that the implementation may be directly called from a toolkit, e.g., PyTorch.

Figure 14B:
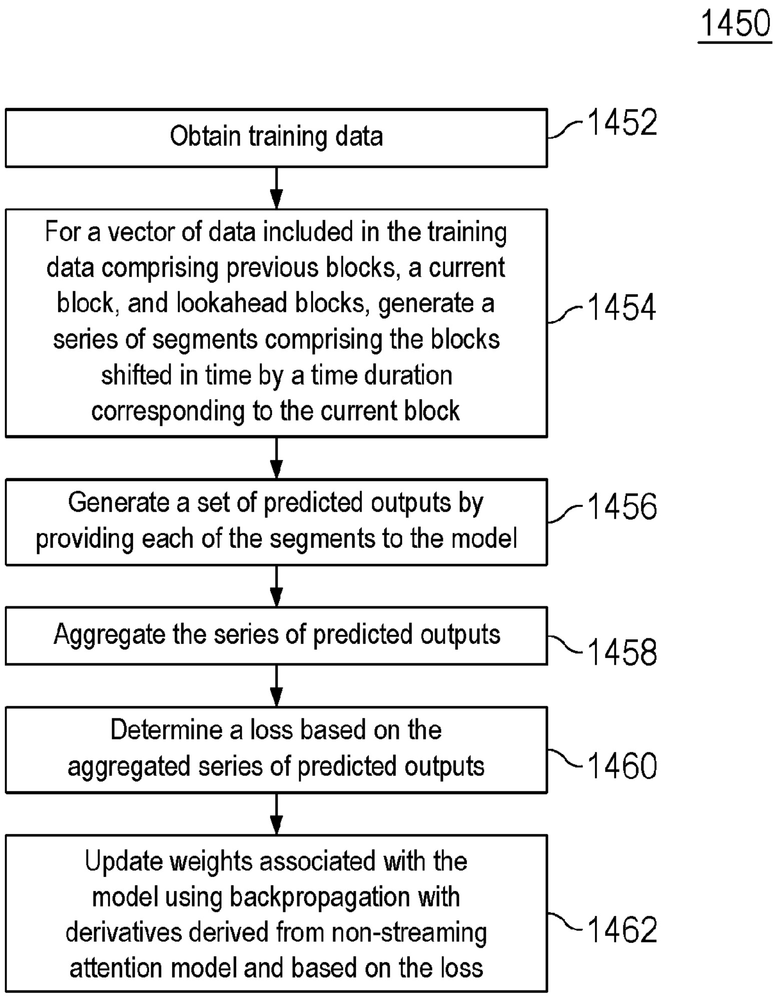
FIG. 14B is a flowchart of another example process for fine tuning a network that has been pre-trained using a fold and unfold technique in accordance with some embodiments.

In some embodiments, fine-tuning of a pre-trained model may be accomplished by providing time shifted input segments to the model and aggregating the outputs of the model responsive to the time shifted input segments. Note that the model may be one that does not include components configured to adapt to streaming input, such as a multi-head streaming attention block. Additionally, it should be noted that the techniques described herein of fine-tuning the pre-trained model using time shifted input segments may be applied to fine-tune any suitable model architecture (e.g., a transformer network, a conformer network, etc.) to adapt the model to utilize streaming data as an input. In some embodiments, fine-tuning may be performed by providing, for each input training sample, a series of time shifted segments to the model to generate a corresponding series of predicted outputs. The series of predicted outputs may then be aggregated. A loss may be determined based on the aggregated series of predicted outputs. The weights of the model (e.g., that does not include streaming attention components) may then be updated based on the loss. Note that the input data may include a kernel having a number of frames, where the number of frames includes a number of looking back frames, a current frame, and a number of lookahead frames. The time shifting of segments may depend on a hop size parameter. In some embodiments, the hop size may correspond to the frame or block size. By time shifting the segments and providing them as separate inputs to the model, information mixing from frame-to-frame may be avoided. Note that, in the case of the block-inference method, multiple outputs, each corresponding to a different latency from one layer to another, may be passed from layer to layer, and the final layer may generate a single output from which a loss may be determined. The final layer may select the frame corresponding to the current time. In the case of the frame-inference method, each layer may output a single frame such that the final layer outputs a single frame as well. Note that the outputs of different layers may be aggregated (e.g., using a weighted sum) before performing other operations, such as downstream tasks with different layers or prior to utilizing different loss functions FIG. 14B is a flowchart of an example process 1450 for performing fine-tuning of a model for performing streaming attention inference by time shifting input segments in accordance with some embodiments. In some embodiments, blocks of process 1450 may be executed by one or more control systems or processors of e.g., a server device or other computing device suitable for training a model. In some implementations, the computing device that executes process 1450 may be the same as the computing device that executes process 1300, or a different computing device. In some embodiments, blocks of process 1450 may be executed in an order other than what is shown in FIG. 14B. In some embodiments, two or more blocks of process 1450 may be executed substantially in parallel. In some embodiments, one or more blocks of process 1450 may be omitted.

Process 1450 can begin at 1452 by obtaining training data. The training data may of the same type as data that a trained network configured to generate predictions for streaming data is configured to take as inputs. For example, in an instance in which the trained network is configured to operate on streaming audio data, the training data may correspond to blocks of audio data. As a more particular example, in an instance in which the trained network is to be configured to generate predictions related to speech in streaming audio data, the training data may include blocks of speech audio data.

At 1454, process 1450 can generate, for a vector of data included in the training data comprising look back blocks (e.g., previous frames of data), a current block (e.g., a current frame of audio data), and lookahead blocks (e.g., future frames), a series of segments comprising the blocks shifted in time by a time duration corresponding to the current block. Note that, in an instance in which the data corresponds to audio data, the time duration corresponding to the current block may be the frame duration (e.g., 10 milliseconds, 12 milliseconds, 20 milliseconds, etc.). The vector of data is generally referred to herein as the kernel, and the time duration of the shift is generally referred to herein as the hop size.

Figure 15:
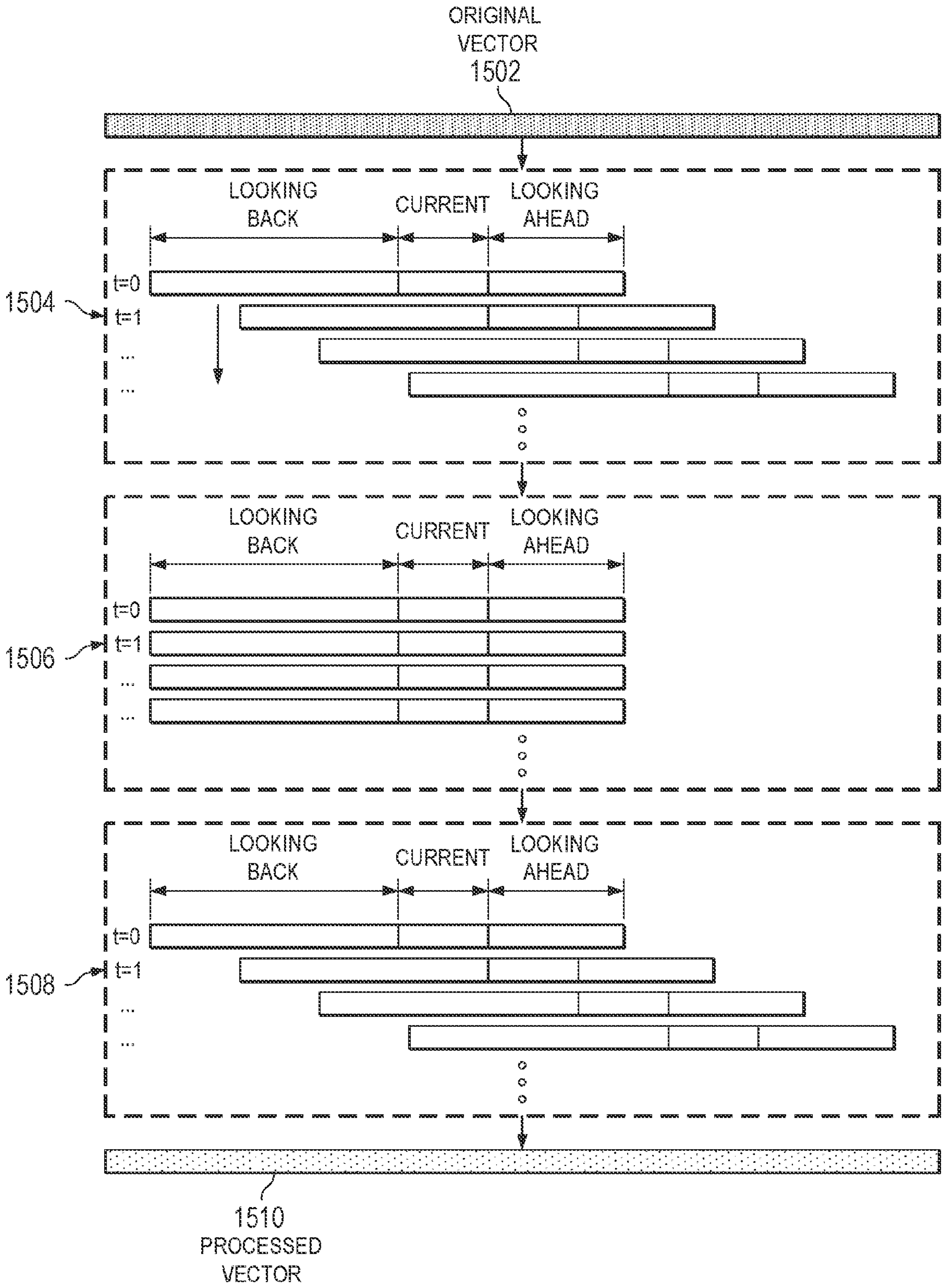
FIG. 15 depicts an example implementation of a fold and unfold technique for fine tuning training in accordance with some embodiments.

Turning to FIG. 15, an input block of data 1502 is shown. From input block of data 1502, a vector of data corresponding to one or more look back blocks, a current block, and one or more lookahead blocks may be identified (e.g., as a portion of input block of data 1502). Panel 1504 illustrates a series of segments that may be generated based on the vector of data, with each segment time shifted by a time duration corresponding to a duration of the current block, as illustrated in FIG. 15.

Referring back to FIG. 14B, at 1456, process 1450 may generate a set of predicted outputs by providing each of the segments to the model. Note that, as described above, the model may be one that does not incorporate any components to process streaming data, such as a multi-head streaming attention block. For example, the model may be a conventional transformer network. There may be one output generated for each input segment.

Turning to FIG. 15, panel 1506 illustrates that the series of segments are arranged in a batch prior to being provided to the model.

Referring back to FIG. 14B, at 1458, process 1450 may aggregate the series of predicted outputs. For example, aggregating the series of predicted outputs may involve applying different loss functions.

Turning to FIG. 15, panel 1508 illustrates a set of aggregated predicted outputs that have been aggregated based on the time shifts of the corresponding time shifted segments of panel 1504, in accordance with some embodiments.

Referring back to FIG. 14B, at 1460, process 1400 can determine a loss based on the aggregated series of predicted outputs. For example, the loss may be determined based on a difference between the aggregated series of predicted outputs and a ground truth prediction associated with the training data.

At 1462, process 1450 can update weights associated with the model using backpropagation derivatives derived from the model that does not include components for streaming attention and based on the loss determined at 1460.

After fine-tuning of the model has been completed, various components of the model may be replaced with streaming attention versions. For example, a multi-head attention block of a conventional transformer network that has been fine-tuned using the techniques described in FIG. 14B may be replaced with a multi-head streaming attention block, e.g., as shown in and described above in connection with FIGS. 6 and/or 9.

Figure 16:
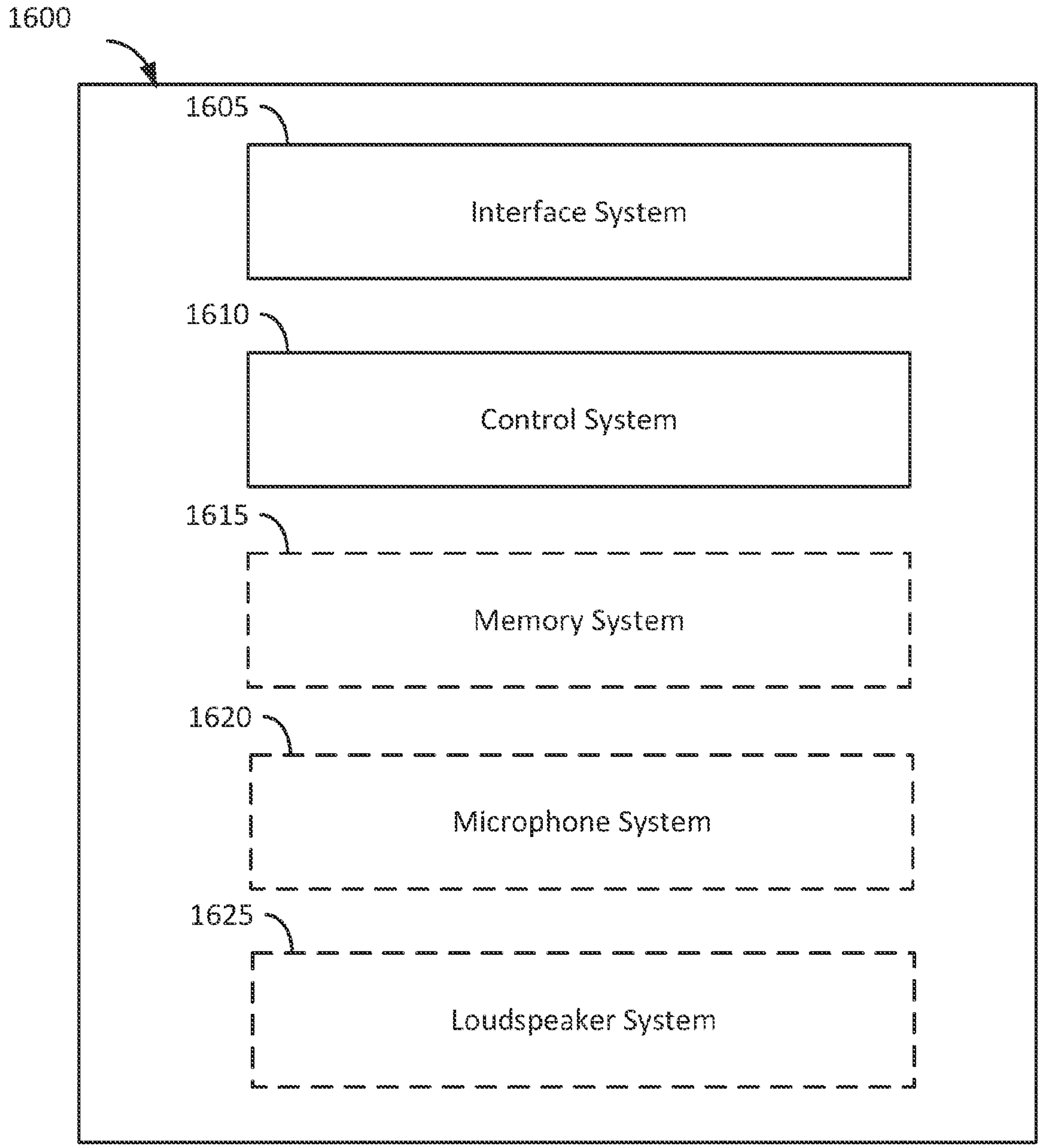
FIG. 16 shows a block diagram that illustrates examples of components of an apparatus capable of implementing various aspects of this disclosure.

FIG. 16 is a block diagram that shows examples of components of an apparatus capable of implementing various aspects of this disclosure. As with other figures provided herein, the types and numbers of elements shown in FIG. 16 are merely provided by way of example. Other implementations may include more, fewer and/or different types and numbers of elements. According to some examples, the apparatus 1600 may be configured for performing at least some of the methods disclosed herein. In some implementations, the apparatus 1600 may be, or may include, a television, one or more components of an audio system, a mobile device (such as a cellular telephone), a laptop computer, a tablet device, a smart speaker, or another type of device.

According to some alternative implementations the apparatus 1600 may be, or may include, a server. In some such examples, the apparatus 1600 may be, or may include, an encoder. Accordingly, in some instances the apparatus 1600 may be a device that is configured for use within an audio environment, such as a home audio environment, whereas in other instances the apparatus 1600 may be a device that is configured for use in "the cloud," e.g., a server.

In this example, the apparatus 1600 includes an interface system 1605 and a control system 1610. The interface system 1605 may, in some implementations, be configured for communication with one or more other devices of an audio environment. The audio environment may, in some examples, be a home audio environment. In other examples, the audio environment may be another type of environment, such as an office environment, an automobile environment, a train environment, a street or sidewalk environment, a park environment, etc. The interface system 1605 may, in some implementations, be configured for exchanging control information and associated data with audio devices of the audio environment. The control information and associated data may, in some examples, pertain to one or more software applications that the apparatus 1600 is executing.

The interface system 1605 may, in some implementations, be configured for receiving, or for providing, a content stream. The content stream may include audio data. The audio data may include, but may not be limited to, audio signals. In some instances, the audio data may include spatial data, such as channel data and/or spatial metadata. In some examples, the content stream may include video data and audio data corresponding to the video data.

The interface system 1605 may include one or more network interfaces and/or one or more external device interfaces (such as one or more universal serial bus (USB) interfaces). According to some implementations, the interface system 1605 may include one or more wireless interfaces. The interface system 1605 may include one or more devices for implementing a user interface, such as one or more microphones, one or more speakers, a display system, a touch sensor system and/or a gesture sensor system. In some examples, the interface system 1605 may include one or more interfaces between the control system 1610 and a memory system, such as the optional memory system 1615 shown in FIG. 16. However, the control system 1610 may include a memory system in some instances. The interface system 1605 may, in some implementations, be configured for receiving input from one or more microphones in an environment.

The control system 1610 may, for example, include a general purpose single- or multi-chip processor, a digital signal processor (DSP), an application specific integrated circuit (ASIC), a field programmable gate array (FPGA) or other programmable logic device, discrete gate or transistor logic, and/or discrete hardware components.

In some implementations, the control system 1610 may reside in more than one device. For example, in some implementations a portion of the control system 1610 may reside in a device within one of the environments depicted herein and another portion of the control system 1610 may reside in a device that is outside the environment, such as a server, a mobile device (e.g., a smartphone or a tablet computer), etc. In other examples, a portion of the control system 1610 may reside in a device within one environment and another portion of the control system 1610 may reside in one or more other devices of the environment. For example, a portion of the control system 1610 may reside in a device that is implementing a cloud-based service, such as a server, and another portion of the control system 1610 may reside in another device that is implementing the cloud-based service, such as another server, a memory device, etc. The interface system 1605 also may, in some examples, reside in more than one device. In some implementations, a portion of a control system may reside in or on an earbud.

In some implementations, the control system 1610 may be configured for performing, at least in part, the methods disclosed herein. According to some examples, the control system 1610 may be configured for implementing methods of updating query, key and value buffers, generating streaming attention vectors based on buffered query, key, and value parameters, or the like.

Some or all of the methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. The one or more non-transitory media may, for example, reside in the optional memory system 1615 shown in FIG. 16 and/or in the control system 1610. Accordingly, various innovative aspects of the subject matter described in this disclosure can be implemented in one or more non-transitory media having software stored thereon. The software may, for example, extract objects from a multi-channel audio signal, generate a spatial enhancement mask, apply a spatial enhancement mask, generate an output binaural audio signal, or the like. The software may, for example, be executable by one or more components of a control system such as the control system 1610 of FIG. 16.

In some examples, the apparatus 1600 may include the optional microphone system 1620 shown in FIG. 16. The optional microphone system 1620 may include one or more microphones. In some implementations, one or more of the microphones may be part of, or associated with, another device, such as a speaker of the speaker system, a smart audio device, etc. In some examples, the apparatus 1600 may not include a microphone system 1620. However, in some such implementations the apparatus 1600 may nonetheless be configured to receive microphone data for one or more microphones in an audio environment via the interface system 1610. In some such implementations, a cloud-based implementation of the apparatus 1600 may be configured to receive microphone data, or a noise metric corresponding at least in part to the microphone data, from one or more microphones in an audio environment via the interface system 1610.

According to some implementations, the apparatus 1600 may include the optional loudspeaker system 1625 shown in FIG. 16. The optional loudspeaker system 1625 may include one or more loudspeakers, which also may be referred to herein as "speakers" or, more generally, as "audio reproduction transducers." In some examples (e.g., cloud-based implementations), the apparatus 1600 may not include a loudspeaker system 1625. In some implementations, the apparatus 1600 may include headphones. Headphones may be connected or coupled to the apparatus 1600 via a headphone jack or via a wireless connection (e.g., BLUETOOTH).

Some aspects of present disclosure include a system or device configured (e.g., programmed) to perform one or more examples of the disclosed methods, and a tangible computer readable medium (e.g., a disc) which stores code for implementing one or more examples of the disclosed methods or steps thereof. For example, some disclosed systems can be or include a programmable general purpose processor, digital signal processor, or microprocessor, programmed with software or firmware and/or otherwise configured to perform any of a variety of operations on data, including an embodiment of disclosed methods or steps thereof. Such a general purpose processor may be or include a computer system including an input device, a memory, and a processing subsystem that is programmed (and/or otherwise configured) to perform one or more examples of the disclosed methods (or steps thereof) in response to data asserted thereto.

Some embodiments may be implemented as a configurable (e.g., programmable) digital signal processor (DSP) that is configured (e.g., programmed and otherwise configured) to perform required processing on audio signal(s), including performance of one or more examples of the disclosed methods. Alternatively, embodiments of the disclosed systems (or elements thereof) may be implemented as a general purpose processor (e.g., a personal computer (PC) or other computer system or microprocessor, which may include an input device and a memory) which is programmed with software or firmware and/or otherwise configured to perform any of a variety of operations including one or more examples of the disclosed methods. Alternatively, elements of some embodiments of the inventive system are implemented as a general purpose processor or DSP configured (e.g., programmed) to perform one or more examples of the disclosed methods, and the system also includes other elements (e.g., one or more loudspeakers and/or one or more microphones). A general purpose processor configured to perform one or more examples of the disclosed methods may be coupled to an input device (e.g., a mouse and/or a keyboard), a memory, and a display device.

Another aspect of present disclosure is a computer readable medium (for example, a disc or other tangible storage medium) which stores code for performing (e.g., coder executable to perform) one or more examples of the disclosed methods or steps thereof.

While specific embodiments of the present disclosure and applications of the disclosure have been described herein, it will be apparent to those of ordinary skill in the art that many variations on the embodiments and applications described herein are possible without departing from the scope of the disclosure described and claimed herein. It should be understood that while certain forms of the disclosure have been shown and described, the disclosure is not to be limited to the specific embodiments described and shown or the specific methods described.

The invention claimed is:

1. A method for processing streaming data, the method comprising:

obtaining input data representative of a frame of streaming data;

identifying a query transformation, a key transformation, and a value transformation based on the input data for the frame of streaming data;

updating a query buffer, a key buffer, and a value buffer based on the identified query, key, and value transformations, such that the query buffer, the key buffer, and the value buffer are each configured to store corresponding query, key and value transformations associated with previous frames of streaming data and the frame of streaming data;

retrieving one or more query frames from the updated query buffer to be used to process the input data;

determining a dot product of the retrieved one or more query frames and frames in the key buffer to determine a set of weights;

determining a weighted sum between the set of weights and frames in the value buffer;

utilizing the weighted sum to generate a streaming attention vector, wherein the streaming attention vector is usable by a network to generate a prediction associated with the streaming data.

2. The method of claim 1, wherein the network is a transformer network.

3. The method of claim 1, wherein the streaming data is streaming audio data.

4. The method of claim 1, wherein the prediction associated with the streaming data comprises a prediction of speech emotion associated with the streaming data.

5. The method of claim 1, wherein the prediction associated with the streaming data comprises identification of one or more features useful for provision to one or more downstream machine learning models.

6. The method of claim 5, wherein the one or more features comprise identification of one or more speakers associated with the streaming data.

7. The method of claim 1, wherein the prediction associated with the streaming data comprises classification of one or more words or phonemes of the streaming data.

8. The method of claim 1, wherein at least one of the query buffer, the key buffer, or the value buffer is a circular buffer.

9. The method of claim 1, wherein updating the query buffer comprises:

appending a current query frame based on the query transformation to the query buffer; and discarding an oldest query frame in the query buffer.

10. The method of claim 9, wherein the retrieved one or more query frames correspond to the discarded oldest query frame.

11. The method of claim 1, wherein the network comprises a plurality of layers, and wherein updating the query buffer comprises, for a first layer of the plurality of layers:

appending a current query frame based on the query transformation to the query buffer;

replacing a plurality of query frames in the query buffer with a plurality of lookahead query frames corresponding to future times; and discarding an oldest query frame in the query buffer.

12. The method of claim 11, wherein the retrieved one or more query frames used to process the input block by the first layer of the plurality of layers comprise the current query frame and the plurality of lookahead query frames.

13. The method of claim 11, wherein the plurality of lookahead query frames comprises two lookahead frames.

14. The method of claim 11, wherein the retrieved one or more query frames used to process the input block by each of the plurality of layers other than the first layer is passed to a given layer by a preceding layer.

15. The method of claim 11, wherein updating the key buffer and updating the value buffer comprise:

appending a current key frame based on the key transformation to the key buffer and discarding an oldest key frame from the key buffer;

appending a current value frame based on the value transformation to the value buffer; and discarding an oldest value frame from the value buffer.

16. The method of claim 11, wherein updating the key buffer and updating the value buffer comprise:

appending a current key frame to the key buffer;

replacing a plurality of key frames in the key buffer with a plurality of lookahead key frames based on the key transformation;

discarding an oldest key frame from the key buffer;

appending a current value frame to the value buffer;

replacing a plurality of value frames in the value buffer with a plurality of lookahead value frames based on the value transformation; and discarding an oldest value frame from the value buffer.

17. The method of claim 11, wherein the network was trained by:

performing an initial training using a first version of the network that does not utilize the query buffer, the key buffer, and the value buffer to store a subset of query frames, key frames, and value frames; and performing a subsequent training that modifies weights associated with the network.

18. The method of claim 17, wherein the subsequent training is performed using a second version of the network that includes the query buffer, the key buffer, and the value buffer, and wherein performing the subsequent training comprises performing backpropagation using derivatives derived from the second version of the network.

19. The method of claim 17, wherein the subsequent training is performed using the first version of the network, and wherein performing the subsequent training comprises:

providing, for a given block of training data, a series of time shifted segments to the first version of the network to generate a corresponding series of predicted outputs;

aggregating the series of predicted outputs;

determining a loss based on the aggregated series of predicted outputs; and updating weights associated with the first version of the network based on the loss.

20. A system comprising:

one or more processors; and a non-transitory computer-readable medium storing instructions that, upon execution by the one or more processors, cause the one or more processors to perform operations including:

obtaining input data representative of a frame of streaming data;

identifying a query transformation, a key transformation, and a value transformation based on the input data for the frame of streaming data;

updating a query buffer, a key buffer, and a value buffer based on the identified query, key, and value transformations, such that the query buffer, the key buffer, and the value buffer are each configured to store corresponding query, key and value transformations associated with previous frames of streaming data and the frame of streaming data;

retrieving one or more query frames from the updated query buffer to be used to process the input data;

determining a dot product of the retrieved one or more query frames and frames in the key buffer to determine a set of weights;

determining a weighted sum between the set of weights and frames in the value buffer;

utilizing the weighted sum to generate a streaming attention vector, wherein the streaming attention vector is usable by a network to generate a prediction associated with the streaming data.

21. A non-transitory computer-readable medium storing instructions that, upon execution by one or more processors, cause the one or more processors to perform operations including:

obtaining input data representative of a frame of streaming data;

identifying a query transformation, a key transformation, and a value transformation based on the input data for the frame of streaming data;

updating a query buffer, a key buffer, and a value buffer based on the identified query, key, and value transformations, such that the query buffer, the key buffer, and the value buffer are each configured to store corresponding query, key and value transformations associated with previous frames of streaming data and the frame of streaming data;

retrieving one or more query frames from the updated query buffer to be used to process the input data;

determining a dot product of the retrieved one or more query frames and frames in the key buffer to determine a set of weights;

determining a weighted sum between the set of weights and frames in the value buffer;

utilizing the weighted sum to generate a streaming attention vector, wherein the streaming attention vector is usable by a network to generate a prediction associated with the streaming data.

* * * * *